US011894010B2

(12) United States Patent
Nakatani et al.

(10) Patent No.: US 11,894,010 B2
(45) Date of Patent: Feb. 6, 2024

(54) SIGNAL PROCESSING APPARATUS, SIGNAL PROCESSING METHOD, AND PROGRAM

(71) Applicant: NIPPON TELEGRAPH AND TELEPHONE CORPORATION, Tokyo (JP)

(72) Inventors: Tomohiro Nakatani, Tokyo (JP); Keisuke Kinoshita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 288 days.

(21) Appl. No.: 17/312,912

(22) PCT Filed: Jul. 31, 2019

(86) PCT No.: PCT/JP2019/029921
§ 371 (c)(1),
(2) Date: Jun. 10, 2021

(87) PCT Pub. No.: WO2020/121590
PCT Pub. Date: Jun. 18, 2020

(65) Prior Publication Data

US 2022/0068288 A1 Mar. 3, 2022

(30) Foreign Application Priority Data

Dec. 14, 2018 (JP) ................................ 2018-234075
Apr. 18, 2019 (WO) .................. PCT/JP2019/016587

(51) Int. Cl.
*G10L 21/0208* (2013.01)
*G10L 21/0232* (2013.01)
*G10L 21/0216* (2013.01)

(52) U.S. Cl.
CPC ...... *G10L 21/0208* (2013.01); *G10L 21/0232* (2013.01); *G10L 2021/02082* (2013.01); *G10L 2021/02166* (2013.01)

(58) Field of Classification Search
CPC ............ G10L 21/0208; G10L 21/0232; G10L 21/0216; G10L 21/0272; G10L 21/02;
(Continued)

(56) References Cited

U.S. PATENT DOCUMENTS

2009/0110207 A1* 4/2009 Nakatani ............ G10L 21/0232 381/66
2011/0002473 A1 1/2011 Nakatani et al.

FOREIGN PATENT DOCUMENTS

JP 5227393 B 3/2013

OTHER PUBLICATIONS

Liu, et al., "Neural Network Based Time-Frequency Masking and Steering Vector Estimation for Two-Channel Mvdr Beamforming", hereinafter Liu, 2018 IEEE International Conference on Acoustics, Speech and Signal Processing (ICASSP) ), pp. 6717-6721, Apr. 15-20 (Year: 2018).*

(Continued)

*Primary Examiner* — Leshui Zhang

(57) ABSTRACT

To sufficiently suppress noise and reverberation, a convolutional beamformer for calculating, at each time point, a weighted sum of a current signal and a past signal sequence having a predetermined delay and a length of 0 or more such that it increases a probability expressing a speech-likeness of an estimation signals based on a predetermined probability model is acquired where the estimation signals are acquired by applying the convolutional beamformer to frequency-divided observation signals corresponding respectively to a plurality of frequency bands of observation signals acquired by picking up acoustic signals emitted from a sound source,
(Continued)

whereupon target signals are acquired by applying the acquired convolutional beamformer to the frequency-divided observation signals.

17 Claims, 15 Drawing Sheets

(58) Field of Classification Search
CPC . G10L 2021/02082; G10L 2021/02166; G10L 15/20; G10L 15/876; H04R 3/00; H04R 3/005; H04R 25/407
USPC ....... 704/233, 240, 255; 381/66, 71.1–71.14, 381/92
See application file for complete search history.

(56) References Cited

OTHER PUBLICATIONS

Farrier et al, "Fast beamforming techniques for circular arrays", J. Acoustic Soc. Am., vol. 58, No. 4, pp. 920-922, October (Year: 1975).*
Zhang et al "Microphone Subset Selection for MVDR Beamformer Based Noise Reduction", IEEE/ACM Trans. on Acoustics, Speech and Language Processing, vol.  , No . , pp. 1-13, May 16 (Year: 2017).*
Nakashika et al."Dysarthric Speech Recognition Using a Convolutive Bottleneck Network", ICSP2014 Proceedings, pp. 505-509 (Year: 2014).*
Higuchi et al. (2016) "Robust MVDR beamforming using time-frequency masks for online/offline ASR in noise", Proc. ICASSP 2016.
Heymann et al. (2016) "Neural network based spectral mask estimation for acoustic beamforming," Proc. ICASSP 2016.
Nakatani et al. (2010) "Speech dereverberation based on variance-normalized delayed linear prediction," IEEE Trans. ASLP, 18 (7), 1717-1731.
Yoshioka et al. (2015) "The NTT CHIME-3 system: Advances in speech enhancement and recognition for mobile multi-microphone devices," Proc. IEEE ASRU 2015, 436-443.
Nakatani et al. (2018) "A unified convolutional beamformer for simultaneous denoising and dereverberation" published at https://arxiv.org/abs/1812.08400, on Dec. 20, 2018.

* cited by examiner

| | Sim | | | | Real |
|---|---|---|---|---|---|
| | CD | SRMR | LLR | FWSSNR | SRMR |
| OBSERVATION SIGNAL | 3.97 | 3.68 | 0.58 | 3.62 | 3.18 |
| CONVENTIONAL METHOD 2 | 3.76 | 4.77 | 0.53 | 4.99 | 5.00 |
| CONVENTIONAL METHOD 1 | 3.67 | 4.50 | 0.54 | 4.66 | 4.82 |
| CONVENTIONAL METHOD 3 | 3.01 | **5.37** | 0.48 | 7.52 | 6.57 |
| FIRST EMBODIMENT | **2.64** | 5.34 | **0.39** | **8.18** | **6.64** |

Fig. 12

| | Sim | | | | | | | Real | | |
|---|---|---|---|---|---|---|---|---|---|---|
| | R1N | R1F | R2N | R2F | R3N | R3F | Ave | R1N | R1F | Ave |
| OBSERVATION SIGNAL | 3.13 | 3.94 | 4.71 | 7.31 | 4.70 | 7.50 | 5.22 | 17.53 | 19.68 | 18.61 |
| CONVENTIONAL METHOD 2 | 3.20 | 3.47 | 4.64 | 5.91 | 4.28 | 5.32 | 4.47 | 12.33 | 13.88 | 13.11 |
| CONVENTIONAL METHOD 1 | 3.37 | 3.98 | 3.89 | 4.77 | 4.18 | 5.21 | 4.23 | 10.60 | 13.81 | 12.20 |
| CONVENTIONAL METHOD 3 | 3.32 | 3.76 | 4.10 | 4.61 | 4.57 | 5.71 | 4.35 | 8.75 | 11.31 | 10.03 |
| FIRST EMBODIMENT | 3.20 | 3.45 | 3.87 | 4.22 | 3.75 | 4.19 | 3.78 | 7.86 | 10.67 | 9.27 |

Fig. 13

| | Sim | | | Real |
|---|---|---|---|---|
| | CD | FWSSNR | WER | WER |
| WITHOUT REVERBERATION SUPPRESSION | 3.23 | 6.25 | 4.82 | 12.06 |
| WITH REVERBERATION SUPPRESSION | 2.65 | 7.98 | 3.83 | 9.90 |

Fig. 14

Fig. 15A

WER RealDATA

| | PreFixed NCM | Adaptive NCM |
|---|---|---|
| OBSERVATION SIGNAL | 18.61 | |
| SEVENTH EMBODIMENT | **13.21** | **12.99** |
| NINTH EMBODIMENT | 13.33 | 13.82 |

Fig. 15B

FWSSNR SimDATA

| | PreFixed NCM | Adaptive NCM |
|---|---|---|
| OBSERVATION SIGNAL | 3.62 | |
| SEVENTH EMBODIMENT | **6.82** | **6.57** |
| NINTH EMBODIMENT | 6.15 | 5.66 |

Fig. 15C

CD SimDATA

| | PreFixed NCM | Adaptive NCM |
|---|---|---|
| OBSERVATION SIGNAL | 3.97 | |
| SEVENTH EMBODIMENT | 3.52 | **3.37** |
| NINTH EMBODIMENT | **3.39** | 3.41 |

SIGNAL PROCESSING APPARATUS, SIGNAL PROCESSING METHOD, AND PROGRAM

CROSS-REFERENCE TO RELATED APPLICATIONS

This application is a U.S. 371 Application of International Patent Application No. PCT/JP2019/029921, filed on 31 Jul. 2019, which application claims priority to and the benefit of JP Application No. 2018-234075, filed on 14 Dec. 2018, and International Patent Application No. PCT/JP2019/016587, filed on 18 Apr. 2019, the disclosures of which are hereby incorporated herein by reference in their entireties.

TECHNICAL FIELD

The present invention relates to a signal processing technique for an acoustic signal.

BACKGROUND ART

NPL 1 and NPL 2 disclose a method of suppressing noise and reverberation from an observation signal in the frequency domain. In this method, reverberation and noise are suppressed by receiving an observation signal in the frequency domain and a steering vector representing the direction of a sound source or an estimated vector thereof, estimating an instantaneous beamformer for minimizing the power of the frequency-domain observation signal under a constraint condition that sound reaching a microphone from the sound source is not distorted, and applying the instantaneous beamformer to the frequency-domain observation signal (conventional method 1).

PTL 1 and NPL 3 disclose a method of suppressing reverberation from an observation signal in the frequency domain. In this method, reverberation in an observation signal in the frequency domain is suppressed by receiving an observation signal in the frequency domain and the power of a target sound at each time, or an estimated value thereof, estimating a reverberation suppression filter for suppressing reverberation in the target sound on the basis of a weighted power minimization reference of a prediction error, and applying the reverberation suppression filter to the frequency-domain observation signal (conventional method 2).

NPL 4 discloses a method of suppressing noise and reverberation by cascade-connecting conventional method 2 and conventional method 1. In this method, at a prior stage, an observation signal in the frequency domain and the power of a target sound at each time are received and reverberation is suppressed using conventional method 2, and then, at a later stage, a steering vector is received and reverberation and noise are further suppressed using conventional method 1 (conventional method 3).

CITATION LIST

Patent Literature

[PTL 1] Japanese Patent No. 5227393

Non Patent Literature

[NPL 1] T Higuchi, N Ito, T Yoshioka, T Nakatani, "Robust MVDR beamforming using time-frequency masks for online/offline ASR in noise", Proc. ICASSP 2016, 2016.

[NPL 2] J Heymann, L Drude, R Haeb-Umbach, "Neural network based spectral mask estimation for acoustic beamforming," Proc. ICASSP 2016, 2016

[NPL 3] T Nakatani, T Yoshioka, K Kinoshita, M Miyoshi, B H Juang, "Speech dereverberation based on variance-normalized delayed linear prediction," IEEE Trans. ASLP, 18 (7), 1717-1731, 2010

[NPL 4] Takuya Yoshioka, Nobutaka Ito, Marc Delcroix, Atsunori Ogawa, Keisuke Kinoshita, Masakiyo Fujimoto, Chengzhu Yu, Wojciech J Fabian, Miquel Espi, Takuya Higuchi, Shoko Araki, Tomohiro Nakatani, "The NTT CHiME-3 system: Advances in speech enhancement and recognition for mobile multi-microphone devices," Proc. IEEE ASRU 2015, 436-443, 2015.

SUMMARY OF THE INVENTION

Technical Problem

In the conventional methods, it may be impossible to sufficiently suppress reverberation and noise. Conventional method 1 is a method originally developed for the purpose of suppressing noise and may not always be capable of sufficiently suppressing reverberation. With conventional method 2, noise cannot be suppressed. Conventional method 3 can suppress more noise and reverberation than when conventional method 1 or conventional method 2 is used alone. With conventional method 3, however, conventional method 2 serving as the prior stage and conventional method 1 serving as the later stage are viewed as independent systems and optimization is performed in the respective systems. Therefore, when conventional method 2 is applied at the prior stage, it may not always be possible to sufficiently suppress reverberation due to the effects of noise. Further, when conventional method 1 is applied at the later stage, it may not always be possible to sufficiently suppress noise and reverberation due to the effects of residual reverberation.

The present invention has been designed in consideration of these points, and an object thereof is to provide a technique with which noise and reverberation can be sufficiently suppressed.

Means for Solving the Problem

In the present invention, a convolutional beamformer for calculating, at each time, a weighted sum of a current signal and a past signal sequence having a predetermined delay and a length of 0 or more such that estimation signals of target signals increase a probability expressing a speech-likeness of the estimation signals based on a predetermined probability model is acquired where the estimation signals are acquired by applying the convolutional beamformer to frequency-divided observation signals corresponding respectively to a plurality of frequency bands of observation signals acquired by picking up acoustic signals emitted from a sound source, whereupon the estimation signals are acquired by applying the acquired convolutional beamformer to the frequency-divided observation signals.

Effects of the Invention

In the present invention, the convolutional beamformer such that the estimation signals increases the probability expressing the speech-likeness of the estimation signals based on the probability model is acquired, and therefore noise suppression and reverberation suppression can be optimized as a single system, with the result that noise and reverberation can be sufficiently suppressed.

BRIEF DESCRIPTION OF DRAWINGS

FIG. 12 is a table illustrating examples of test results of the first embodiment.

FIG. 13 is a table illustrating examples of test results of the first embodiment.

FIG. 14 is a table illustrating examples of test results of the fourth embodiment.

FIGS. 15A to 15C are tables illustrating examples of test results of the seventh embodiment.

DESCRIPTION OF EMBODIMENTS

Figure 1A:
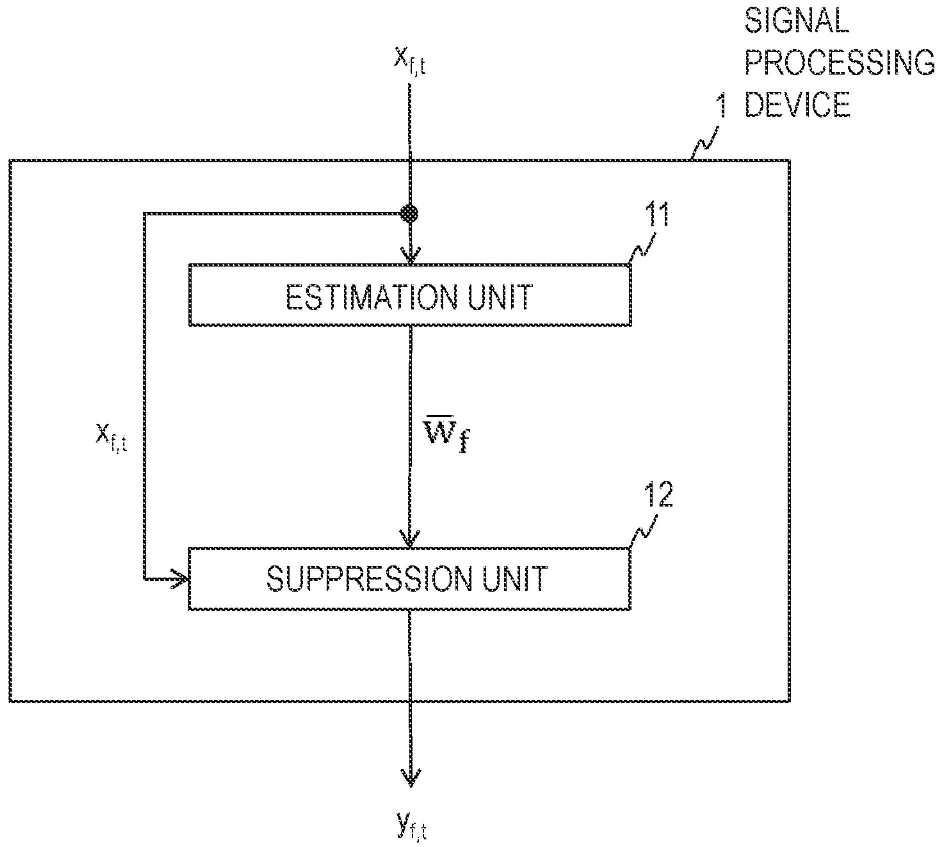
FIG. 1A is a block diagram illustrating an example of a functional configuration of a signal processing device according to a first embodiment.

Embodiments of the present invention will be described below.

[Definitions of Symbols]

First, symbols used in the embodiments will be defined.

M: M is a positive integer expressing a number of microphones. For example, $M \geq 2$.

m: m is a positive integer expressing the microphone number, and satisfies $1 \leq m \leq M$. The microphone number is represented by upper right superscript in round parentheses. In other words, a value or a vector based on a signal picked up by a microphone having the microphone number m is represented by a symbol having the upper right superscript "(m)" (for example, $x_{f,t}^{(m)}$).

N: N is a positive integer expressing the total number of time frames of signals. For example, $N \geq 2$.

t, τ: t and τ are positive integers expressing the time frame number, and t satisfies $1 \leq t \leq N$. The time frame number is represented by lower right subscript. In other words, a value or a vector corresponding to a time frame having the time frame number t is represented by a symbol having the lower right subscript "t" (for example, $x_{f,t}^{(m)}$). Similarly, a value or a vector corresponding to a time frame having the time frame number t is represented by a symbol having the lower right subscript "τ".

P: P is a positive integer expressing a total number of frequency bands (discrete frequencies). For example, $P \geq 2$.

f: f is a positive integer expressing the frequency band number, and satisfies $1 \leq f \leq P$. The frequency band number is represented by lower right subscript. In other words, a value or a vector corresponding to a frequency band having the frequency band number f is represented by a symbol having the lower right subscript "f" (for example, $x_{f,t}^{(m)}$).

T: T expresses a non-conjugated transpose of a matrix or a vector. $\alpha_0^T$ represents a matrix or a vector acquired by non-conjugated transposition of $\alpha_0$.

H: H expresses a conjugated transpose of a matrix or a vector. $\alpha_0^H$ represents a matrix or a vector acquired by conjugated transposition of $\alpha_0$.

$|\alpha_0|$: $|\alpha_0|$ expresses the absolute value of $\alpha_0$.

$\|\alpha_0\|$: $\|\alpha_0\|$ expresses the norm of $\alpha_0$.

$|\alpha_0|_\gamma$: $|\alpha_0|_\gamma$ expresses a weighted absolute value $\gamma|\alpha_0|$ of $\alpha_0$.

$\|\alpha_0\|_\gamma$: $\|\alpha_0\|_\gamma$ expresses a weighted norm $\gamma\|\alpha_0\|$ of $\alpha_0$.

In this specification, a"target signal" denotes a signal corresponding to a direct sound and an initial reflected sound, within a signal (for example, a frequency-divided observation signal) corresponding to a sound emitted from a target sound source and picked up by a microphone. The initial reflected sound denotes a reverberation component derived from the sound emitted from the target sound source that reaches the microphone at a delay of no more than several tens of milliseconds following the direct sound. The initial reflected sound typically acts to improve the clarity of the sound, and in this embodiment, a signal corresponding to the initial reflected sound is also included in the target signal. Here, the signal corresponding to the sound picked up by the microphone also includes, in addition to the target signal described above, late reverberation (a component acquired by excluding the initial reflected sound from the reverberation) derived from the sound emitted from the target sound source, and noise derived from a source other than the target sound source. Ina signal processing method, the target signal is estimated by suppressing late reverberation and noise from a frequency-divided observation signal corresponding to a sound recorded by the microphone, for example. In this specification, unless specified otherwise, "reverberation" is assumed to refer to "late reverberation".

[Principles]

Next, principles will be described.

<Prerequisite Method 1>

Method 1 serving as a prerequisite of the method according to the embodiments will now be described. In method 1, noise and reverberation are suppressed from an M-dimensional observation signal (frequency-divided observation signals) in the frequency domain $$x_{f,t} = [x_{f,t}^{(1)}, x_{f,t}^{(2)}, \ldots, x_{f,t}^{(M)}]^T \quad (1)$$

The frequency-divided observation signals $x_{f,t}$ are acquired by transforming M observation signals, which are acquired by picking up acoustic signals emitted from one or a plurality of sound sources in M microphones, to the frequency domain. The observation signals are acquired by picking up acoustic signals emitted from the sound sources in an environment where noise and reverberation exist. $x_{f,t}^{(m)}$ is acquired by transforming an observation signal that is acquired by being picked up by the microphone having the microphone number m to the frequency domain. $x_{f,t}^{(m)}$ corresponds to the frequency band having the frequency band number f and the time frame having the time frame number t. In other words, the frequency-divided observation signals $x_{f,t}$ are time series signals.

In method 1, an instantaneous beamformer $w_{f,0}$ for minimizing a cost function $C_1(w_{f,0})$ below is determined for each frequency band under the constraint condition in which "the target signals are not distorted as a result of applying an instantaneous beamformer (for example, a minimum power distortionless response beamformer) $w_{f,0}$ for calculating the weighted sum of the signals at the current time to the frequency-divided observation signals $x_{f,t}$ at each time".

$$C_1(w_{f,0}) = \sum_{t=1}^{N} |w_{f,0}{}^H x_{f,t}|^2 \tag{2}$$

$$w_{f,0} = [w_{f,0}^{(1)}, w_{f,0}^{(2)}, \dots, w_{f,0}^{(M)}]^T \tag{3}$$

Note that the lower right subscript "0" of $w_{f,0}$ does not represent the time frame number, $w_{f,0}$ being independent of the time frame. The constraint condition is a condition in which, for example, $w_{f,0}{}^H v_{f,0}$ is a constant (1, for example). Here, $$v_{f,0} = [v_{f,0}^{(1)}, v_{f,0}^{(2)}, \dots, v_{f,0}^{(M)}]^T \tag{4}$$

is a steering vector having, as an element, a transfer function $v_{f,0}^{(m)}$ relating to the direct sound and the initial reflected sound from the sound source to each microphone (the sound pickup position of the acoustic signal), or an estimated vector (an estimated steering vector) thereof. In other words, $v_{f,0}$ is expressed by an M-dimensional (the dimension of the number of microphones) vector having, as an element, the transfer function $v_{f,0}^{(m)}$, which corresponds to the direct sound and initial reflected sound parts of an impulse response from the sound source position to each microphone (i.e. the reverberation that arrives at a delay of no more than several tens of milliseconds (for example, within 30 milliseconds) following the direct sound). When it is difficult to estimate the gain of the steering vector, a normalized vector acquired by normalizing the transfer function of each element so that the gain of a microphone having one of the microphone numbers $m_0 \in \{1, \dots, M\}$ becomes a constant g ($g \neq 0$) may be used as $v_{f,0}$. In other words, as illustrated below, a normalized vector may be used as $v_{f,0}$.

$$v_{f,0} \leftarrow g \frac{v_{f,0}}{v_{f,0}^{(m_0)}} \tag{5}$$

By applying the instantaneous beamformer $w_{f,0}$ acquired as described above to the frequency-divided observation signal $x_{f,t}$ of each frequency band in the manner illustrated below, an estimation signal of a target signal $y_{f,t}$ in which noise and reverberation have been suppressed from the frequency-divided observation signal $x_{f,t}$ is acquired.

$$y_{f,t} = w_{f,0}{}^H x_{f,t} \tag{6}$$

<Prerequisite Method 2>

Method 2 serving as a prerequisite of the method according to the embodiments will now be described. In method 2, reverberation is suppressed from the frequency-divided observation signal $x_{f,t}$. In method 2, a reverberation suppression filter $F_{f,\tau}$ for minimizing a cost function $C_2(F_f)$ below is determined for $\tau = d, d+1, \dots, d+L-1$ in each frequency band.

$$C_2(F_f) = \sum_{t=1}^{N} \left\| x_{f,t} - \sum_{\tau=d}^{d+L-1} F_{f,\tau}{}^H x_{f,t-\tau} \right\|_{\sigma_{f,t}^{-2}} \tag{7}$$

Here, the reverberation suppression filter $F_{f,\tau}$ is an M×M-dimensional matrix filter for suppressing reverberation from the frequency-divided observation signal $x_{f,t}$. d is a positive integer expressing a prediction delay. L is a positive integer expressing the filter length. $\sigma_{f,t}^2$ is the power of the target signal, which is expressed as follows.

$$\sigma_{f,t}^{-2} = \frac{1}{\sigma_{f,t}^2}$$

$\|x\|_\gamma$ relating to the frequency-divided observation signal x is the weighted norm $\|x\|_\gamma = \gamma(x^H x)$ of the frequency-divided observation signal x.

By applying the reverberation suppression filter $F_{f,t}$ acquired as described above to the frequency-divided observation signal $x_{f,t}$ of each frequency band in the manner illustrated below, an estimation signal of a target signal $z_{f,t}$ in which reverberation has been suppressed from the frequency-divided observation signal $x_{f,t}$ is acquired.

$$z_{f,t} = x_{f,t} - \sum_{\tau=d}^{d+L-1} F_{f,\tau}{}^H X_{f,t-\tau} \tag{8}$$

Here, the estimation signal of the target signal $z_{f,t}$ is an M-dimensional column vector, as shown below.

$$z_{f,t} = [z_{f,t}^{(1)}, z_{f,t}^{(2)}, \dots, z_{f,t}^{(M)}]^T$$

<Method of Embodiments>

The method of the embodiments will now be described. An estimation signal of a target signal $y_{f,t}$ acquired by suppressing noise and reverberation from the frequency-divided observation signal $x_{f,t}$ by using a method integrating methods 1 and 2 can be modeled as follows.

$$y_{f,t} = w_{f,0}{}^H \left( x_{f,t} - \sum_{\tau=d}^{d+L-1} F_{f,\tau}{}^H x_{f,t-\tau} \right) \tag{9}$$

-continued $$= w_{f,0}{}^H x_{f,t} \sum_{\tau=d}^{d+L-1} \overline{w}_{f,\tau}{}^H \overline{x}_{f,t-\tau}$$

$$= \overline{w}_f{}^H \overline{x}_{f,t}$$

Here, with respect to $\tau \neq 0$, $w_{f,\tau} = -F_{f,\tau} w_{f,0}$, and $w_{f,\tau}$ corresponds to a filter for performing noise suppression and reverberation suppression simultaneously. $w^{-}_{f}$ is a convolutional beamformer that calculates a weighted sum of a current signal and a past signal sequence having a predetermined delay at each time. Note that the "–" of "$w^{-}_{f}$" should be written directly above the "w", as shown below, but due to notation limitations may also be written to the upper right of "w".

$$\overline{w}_f$$

The convolutional beamformer $w^{-}_{f}$ calculates the weighted sum of the current signal and a past signal sequence having a predetermined delay at each time point. The convolutional beamformer $w^{-}_{f}$ is expressed as shown below, for example, $$\overline{w}_f = \left[\overline{w}_f^{(1)T}, \overline{w}_f^{(2)T}, \ldots, \overline{w}_f^{(M)T}\right]^T \tag{10}$$

where the following is satisfied.

$$\overline{w}_f^{(m)} = \left[w_{f,0}^{(m)}, w_{f,d}^{(m)}, w_{f,d+1}^{(m)}, \ldots, w_{d+L-1}^{(m)}\right]^T \tag{10A}$$

Further, $x^{-}_{f,t}$ is expressed as follows.

$$\overline{x}_{f,t} = \left[\overline{x}_{f,t}^{(1)T}, \overline{x}_{f,t}^{(2)T}, \ldots, \overline{x}_{f,t}^{(M)T}\right]^T \tag{11}$$

$$\overline{x}_{f,t}^{(m)} = \left[x_{f,t}^{(m)}, x_{f,t-d}^{(m)}, x_{f,t-d-1}^{(m)}, \ldots, x_{f,t-d-L+1}^{(m)}\right]^T \tag{11A}$$

Note that throughout this specification, cases in which L=0 in equations (9) to (11A) are also assumed to be included in the convolutional beamformer of the present invention. In other words, even cases in which the length of the past signal sequence used by the convolutional beamformer to calculate the weighted sum is 0 are treated as examples of realization of the convolutional beamformer. At this time, the term Σ in equation (9) becomes 0, and therefore equation (9) becomes equation (9A), shown below. Further, the respective right sides of equations (10A) and (11A) become vectors constituted respectively by only one first element (i.e., scalars), and therefore become equations (10AA) and (11AA), respectively.

$$y_{f,t} = w_{f,0}{}^H x_{f,t} \tag{9A}$$

$$= \overline{w}_f{}^H \overline{x}_{f,t}$$

$$\overline{w}_f^{(m)} = w_{f,0}^{(m)} \tag{10AA}$$

$$\overline{x}_{f,t}^{(m)} = x_{f,t}^{(m)} \tag{11AA}$$

Note that the convolutional beamformer $w^{-}_{f}$ of equation (9A) is a beamformer that calculates, at each time point, the weighted sum of the current signal and a signal sequence having a predetermined delay and a length of 0, and therefore the convolutional beamformer calculates the weighted value of the current signal at each time point. Further, as will be described below, even when L=0, the signal processing device of the present invention can acquire the estimation signal of the target signal by determining a convolutional beamformer on the basis of a probability expressing a speech-likeness and applying the convolutional beamformer to the frequency-divided observation signals.

Here, assuming that $y_{f,t}$ in equation (9) preferably conforms to a speech probability density function p $(\{y_{f,t}\}_{t=1:N}; w^{-}_{f})$ (a probability model), the signal processing device determines the convolutional beamformer $w^{-}_{f}$ such that it increases the probability p $(\{y_{f,t}\}_{t=1:N}; w^{-}_{f})$ (in other words, a probability expressing the speech-likeness of $y_{f,t}$) of $y_{f,t}$ based on the speech probability density function. Preferably, the convolutional beamformer $w^{-}_{f}$ which maximizes the probability expressing the speech-likeness of $y_{f,t}$ is determined. For example, the signal processing device determines the convolutional beamformer $w^{-}_{f}$ such that it increases log p $(\{y_{f,t}\}_{t=1:N}; w^{-}_{f})$, and preferably determines the convolutional beamformer $w^{-}_{f}$ which maximizes log p $(\{y_{f,t}\}_{t=1:N}; w^{-}_{f})$.

A complex normal distribution having an average of 0 and a variance matching the power $\sigma_{f,t}^2$ of the target signal can be cited as an example of a speech probability density function. The "target signal" is a signal corresponding to the direct sound and the initial reflected sound, within a signal corresponding to a sound emitted from a target sound source and picked up by a microphone. Further, the signal processing device determines the convolutional beamformer $w^{-}_{f}$ under the constraint condition in which "the target signals are not distorted as a result of applying the convolutional beamformer $w^{-}_{f}$ to the frequency-divided observation signals $x_{f,t}$", for example. This constraint condition is a condition in which, for example, $w_{f,0}{}^H v_{f,0}$ is a constant (1, for example). On the basis of this constraint condition, for example, the signal processing device determines $w^{-}_{f}$ which maximizes log p $(\{y_{f,t}\}_{t=1:N}; w^{-}_{f})$, which is determined as shown below, for each frequency band.

$$\log p(\{y_{f,t}\}_{t=1:M}; \overline{w}_f) = -\sum_{t=1}^{N} \frac{\left|\overline{w}_f{}^H \overline{x}_{f,t}\right|}{\sigma_{f,t}^2} + const. \tag{12}$$

Here, "const." expresses a constant.

The following function, which is acquired by subtracting the constant term (const.) from log p $(\{y_{f,t}\}_{t=1:N}; w^{-}_{f})$ in equation (12) and reversing the plus/minus sign, is set as a cost function $C_3$ $(w^{-}_{f})$.

$$C_3(\overline{w}_f) = \sum_{t=1}^{N} \frac{\left|\overline{w}_f{}^H \overline{x}_{f,t}\right|}{\sigma_{f,t}^2} = \overline{w}_f{}^H R_f \overline{w}_f \tag{13}$$

Here, R is a weighted space-time covariance matrix determined as shown below.

$$R_f = \sum_{t=1}^{N} \frac{\overline{x}_{f,t} \overline{x}_{f,t}{}^H}{\sigma_{f,t}^2} \tag{14}$$

The signal processing device may determine $w^{-}_{f}$ which minimizes the cost function $C_3$ $(w^{-}_{f})$ of equation (13) under the constraint condition described above (in which, for example, $w_{f,0}^H v_{f,0}$ is a constant), for example.

The analytical solution of $\bar{w}_f$ for minimizing the cost function $C_3(\bar{w}_f)$ under the constraint condition described above (in which, for example, $w_{f,0}^H v_{f,0}=1$) is as shown below.

$$\bar{w}_f = \frac{R_f^{-1}\bar{v}_f}{\bar{v}_f^H R_f^{-1}\bar{v}_f} \tag{15}$$

Here, $\bar{v}_f$ is a vector acquired by disposing the element $v_{f,0}^{(m)}$ of the steering vector $v_{f,0}$ as follows.

$$\bar{v}_f = \left[\bar{v}_f^{(1)T}, \bar{v}_f^{(2)T}, \ldots, \bar{v}_f^{(M)T}\right]^T,$$

$$\bar{v}_f^{(m)} = \left[v_{f,0}^{(m)}, 0, \ldots, 0\right]^T$$

Here, $\bar{v}_f^{(m)}$ is an L+1-dimensional column vector having $v_{f,0}^{(m)}$, and L zeros as elements.

The signal processing device acquires the estimation signal of the target signal $y_{f,t}$ by applying the determined convolutional beamformer $\bar{w}_f$ to the frequency-divided observation signal $x_{f,t}$ as follows.

$$y_{f,t} = \bar{w}_f^H \bar{x}_{f,t} \tag{16}$$

First Embodiment

Next, a first embodiment will be described.

As illustrated in FIG. 1A, a signal processing device 1 according to this embodiment includes an estimation unit 11 and a suppression unit 12.

<Step S11>

Figure 1B:
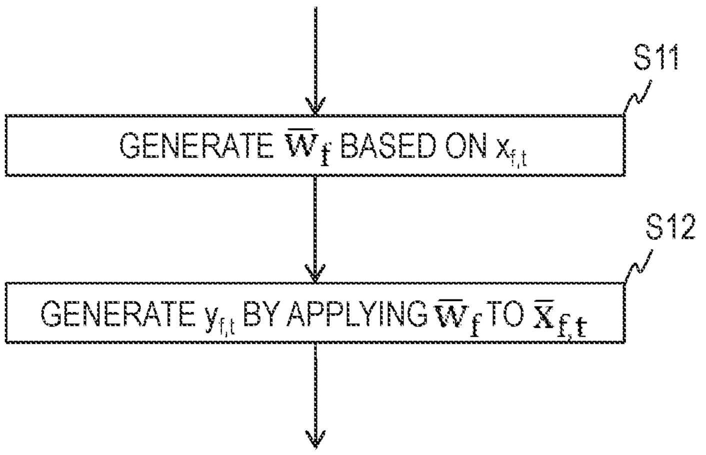
FIG. 1B is a flowchart illustrating an example of a signal processing method according to the first embodiment.

As illustrated in FIG. 1B, the frequency-divided observation signal $x_{f,t}$ is input into the estimation unit 11 (equation (1)). The estimation unit 11 acquires and outputs the convolutional beamformer $\bar{w}_f$ for calculating the weighted sum of the current signal and a past signal sequence having a predetermined delay at each time such that the estimation signals increase the probability expressing the speech-likeness of the estimation signals based on the predetermined probability model where the estimation signals are acquired by applying the convolutional beamformer $\bar{w}_f$ to the frequency-divided observation signals $x_{f,t}$ in respective frequency bands. For example, the estimation unit 11 determines the convolutional beamformer $\bar{w}_f$ such that it increases the probability expressing speech-likeness of $y_{f,t}$ based on the probability density function $p(\{y_{f,t}\}_{t=1:N}; \bar{w}_f)$ (such that $\log p(\{y_{f,t}\}_{t=1:N}; \bar{w}_f)$ is increased, for example). The estimation unit 11 preferably determines the convolutional beamformer $\bar{w}_f$ which maximizes the probability (maximizes $\log p(\{y_{f,t}\}_{t=1:N}; \bar{w}_f)$, for example).

<Step S12>

The frequency-divided observation signal $x_{f,t}$ and the convolutional beamformer $\bar{w}_f$ acquired in step S11 are input into the suppression unit 12. The suppression unit 12 acquires and outputs the estimation signal of the target signal $y_{f,t}$ by applying the convolutional beamformer $\bar{w}_f$ to the frequency-divided observation signal $x_{f,t}$ in each frequency band. For example, the suppression unit 12 acquires and outputs the estimation signal of the target signal $y_{f,t}$ by applying $\bar{w}_f$ to $\bar{x}_{f,t}$ as shown in equation (16).

<Features of this Embodiment>

In this embodiment, the convolutional beamformer $\bar{w}_f$ for calculating the weighted sum of the current signal and a past signal sequence having a predetermined delay at each time such that the estimation signals increases the probability expressing the speech-likeness of the estimation signals based on the predetermined probability model is determined where the estimation signals are acquired by applying the convolutional beamformer $\bar{w}_f$ to the frequency-divided observation signals $x_{f,t}$. This corresponds to optimizing noise suppression and reverberation suppression as a single system. In this embodiment, therefore, noise and reverberation can be suppressed more adequately than with the conventional methods.

Second Embodiment

Next, a second embodiment will be described. Hereafter, processing units and steps described heretofore will be cited using identical reference numerals, and description thereof will be simplified.

Figure 2A:
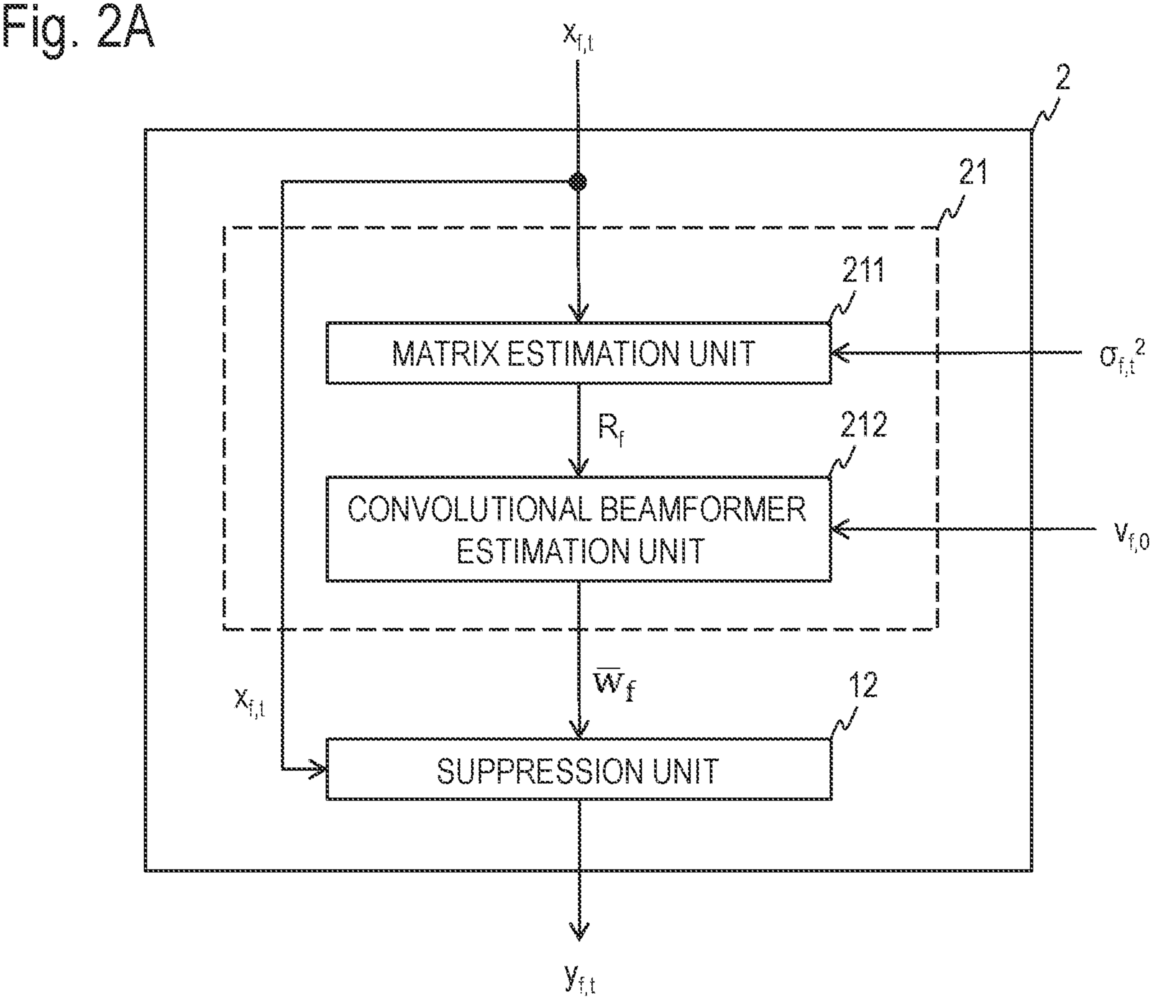
FIG. 2A is a block diagram illustrating an example of a functional configuration of a signal processing device according to a second embodiment.

As illustrated in FIG. 2A, a signal processing device 2 according to this embodiment includes an estimation unit 21 and the suppression unit 12. The estimation unit 21 includes a matrix estimation unit 211 and a convolutional beamformer estimation unit 212.

The estimation unit 21 of this embodiment acquires and outputs the convolutional beamformer $\bar{w}_f$ which minimizes a sum of values (the cost function $C_3(\bar{w}_f)$ of equation (13), for example) acquired by weighting the power of the estimation signals at each time belonging to a predetermined time interval by the reciprocal of the power $\sigma_{f,t}^2$ of the target signals or the reciprocal of the estimated power $\sigma_{f,t}^2$ of the target signals under the constraint condition in which "the target signals are not distorted as a result of applying the convolutional beamformer $\bar{w}_f$ to the frequency-divided observation signals $x_{f,t}$". As illustrated in equation (9), the convolutional beamformer $\bar{w}_f$ is equivalent to a beamformer acquired by integrating a reverberation suppression filter $F_{f,t}$ for suppressing reverberation from the frequency-divided observation signal $x_{f,t}$ and the instantaneous beamformer $w_{f,0}$ for suppressing noise from a signal acquired by applying the reverberation suppression filter $F_{f,t}$ to the frequency-divided observation signal $x_{f,t}$. Further, the constraint condition is a condition in which, for example, "a value acquired by applying an instantaneous beamformer to a steering vector having, as an element, transfer functions relating to the direct sound and the initial reflected sound from the sound source to the to the pickup position of the acoustic signals, or an estimated steering vector, which is an estimated vector of the steering vector, is a constant ($w_{f,0}^H v_{f,0}$ is a constant)". The processing will be described in detail below.

<Step S211>

Figure 2B:
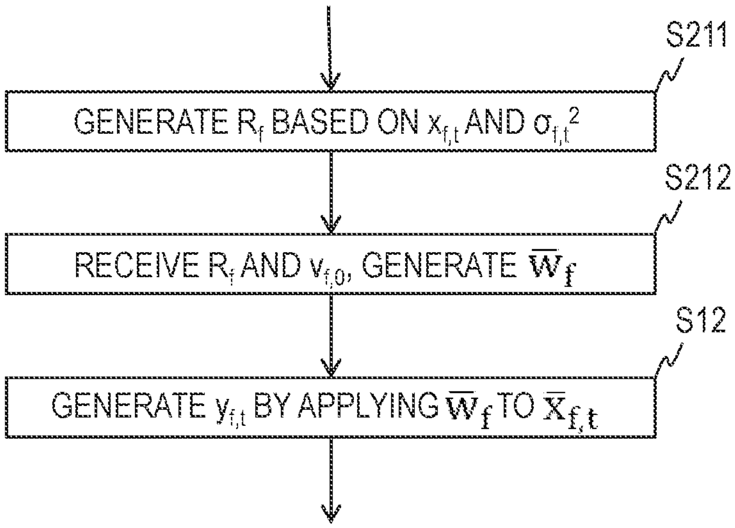
FIG. 2B is a flowchart illustrating an example of a signal processing method according to the second embodiment.

As illustrated in FIG. 2B, the frequency-divided observation signals $x_{f,t}$ and the power or estimated power $\sigma_{f,t}^2$ of the target signals are input into the matrix estimation unit 211. The matrix estimation unit 211 acquires and outputs a weighted space-time covariance matrix $R_f$ for each frequency band on the basis of the frequency-divided observation signals $x_{f,t}$ and the power or estimated power $\sigma_{f,t}^2$ of the target signal. For example, the matrix estimation unit 211 acquires and outputs the weighted space-time covariance matrix $R_f$ in accordance with equation (14).

<Step S212>

The steering vector or estimated steering vector $v_{f,0}$ (equation (4) or (5)) and the weighted space-time covariance matrix $R_f$ acquired in step S211 are input into the convolutional beamformer estimation unit 212. The convolutional beamformer estimation unit 212 acquires and outputs the convolutional beamformer $w^{-}_{f}$ on the basis of the weighted space-time covariance matrix $R_f$ and the steering vector or estimated steering vector $v_{f,0}$. For example, the convolutional beamformer estimation unit 212 acquires and outputs the convolutional beamformer $w^{-}_{f}$ in accordance with equation (15).

<Step S12>

This step is identical to the first embodiment, and therefore description thereof has been omitted.

<Features of this Embodiment>

In this embodiment, the weighted space-time covariance matrix $R_f$ is acquired, and on the basis of the weighted space-time covariance matrix $R_f$ and the steering vector or estimated steering vector $v_{f,0}$, the convolutional beamformer $w^{-}_{f}$ is acquired. This corresponds to optimizing noise suppression and reverberation suppression as a single system. In this embodiment, therefore, noise and reverberation can be suppressed more adequately than with the conventional methods.

Third Embodiment

Next, a third embodiment will be described. In this embodiment, an example of a method of generating $\sigma_{f,t}^2$ and $v_{f,0}$ will be described.

Figure 3:
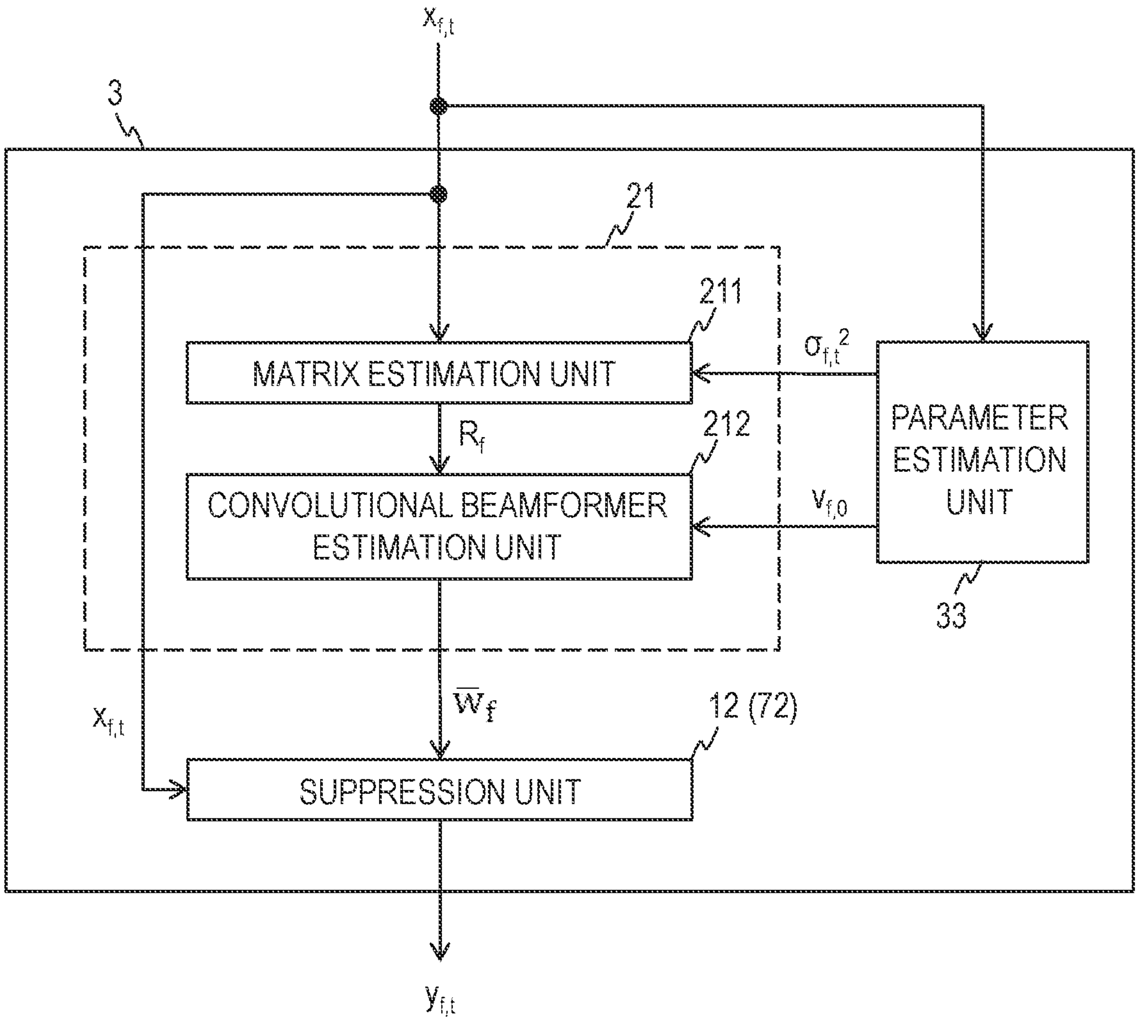
FIG. 3 is a block diagram illustrating an example of a functional configuration of a signal processing device according to a third embodiment.
Figure 4:
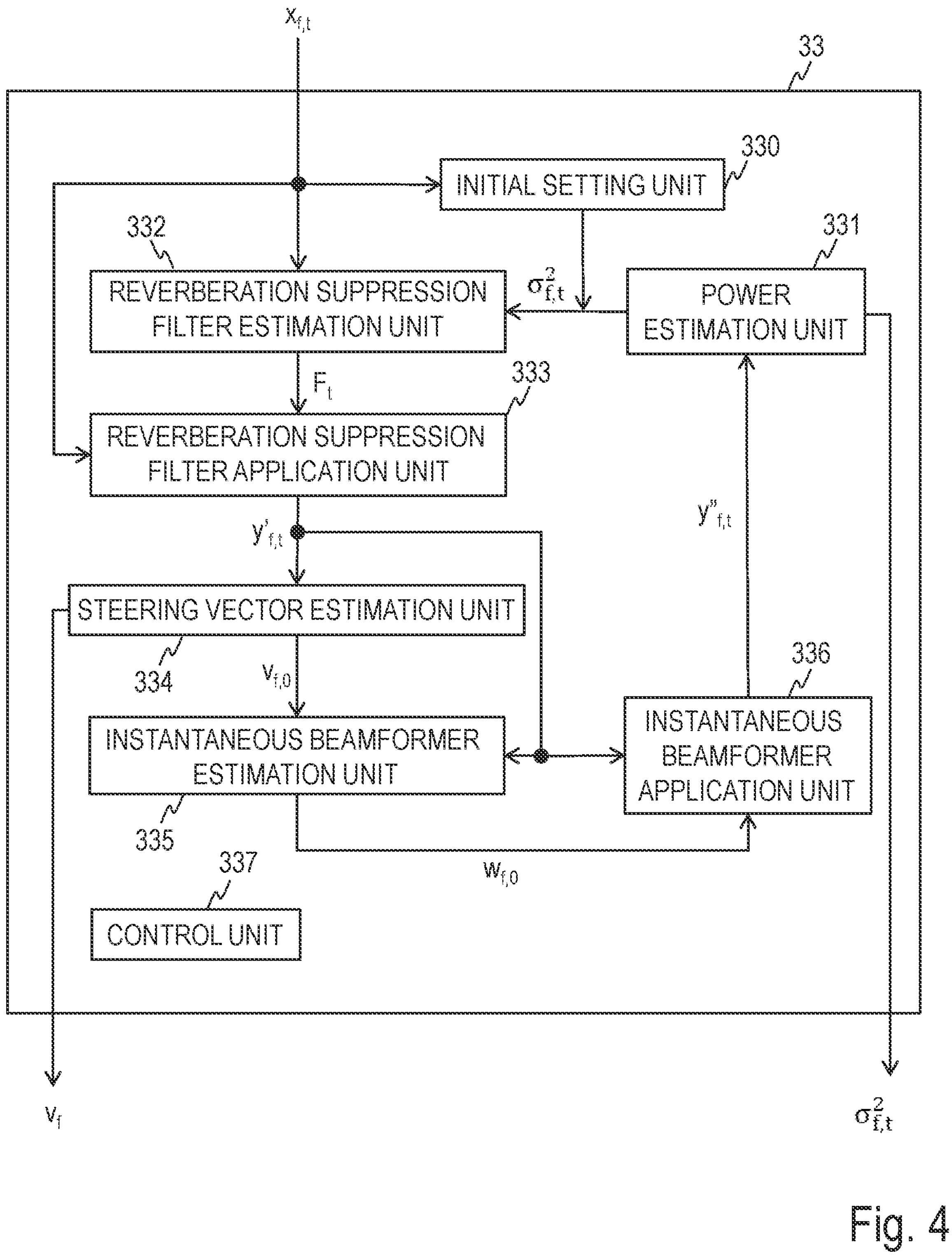
FIG. 4 is a block diagram illustrating an example of a functional configuration of a parameter estimation unit illustrated in FIG. 3.
Figure 5:
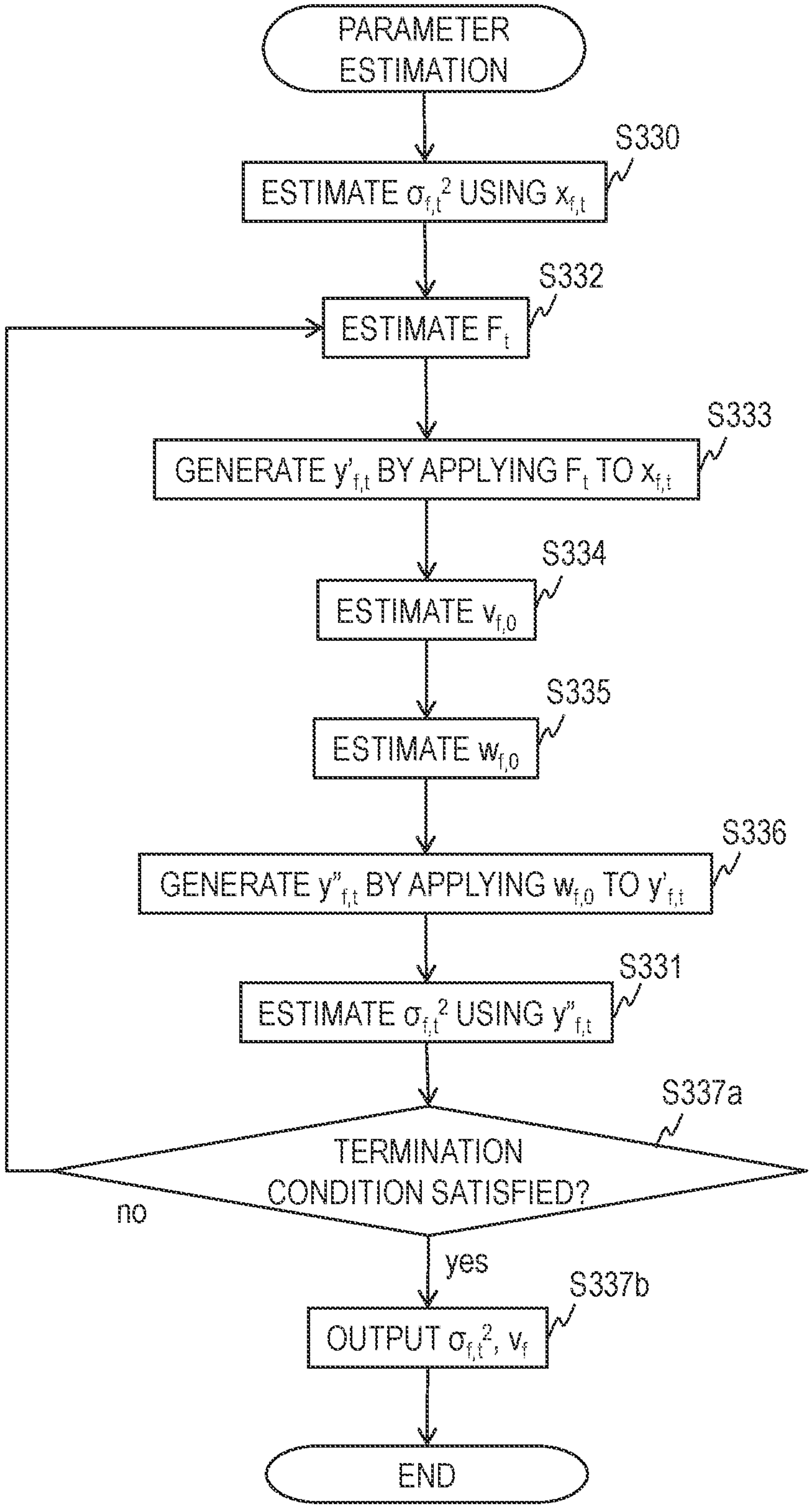
FIG. 5 is a flowchart illustrating an example of a parameter estimation method according to the third embodiment.

As illustrated in FIG. 3, a signal processing device 3 according to this embodiment includes the estimation unit 21, the suppression unit 12, and a parameter estimation unit 33. The estimation unit 21 includes the matrix estimation unit 211 and the convolutional beamformer estimation unit 212. Further, as illustrated in FIG. 4, the parameter estimation unit 33 includes an initial setting unit 330, a power estimation unit 331, a reverberation suppression filter estimation unit 332, a reverberation suppression filter application unit 333, a steering vector estimation unit 334, an instantaneous beamformer estimation unit 335, an instantaneous beamformer application unit 336, and a control unit 337.

Hereafter, only the processing executed by the parameter estimation unit 33, which differs from the second embodiment, will be described. The processing performed by the other processing units is as described in the first and second embodiments.

<Step S330>

The frequency-divided observation signal $x_{f,t}$ is input into the initial setting unit 330. Using the frequency-divided observation signal $x_{f,t}$, the initial setting unit 330 generates and outputs a provisional power $\sigma_{f,t}^2$, which is a provisional value of the estimated power $\sigma_{f,t}^2$ of the target signal. For example, the initial setting unit 330 generates and outputs the provisional power $\sigma_{f,t}$ as follows.

$$\sigma_{f,t}^2 = \frac{x_{f,t}{}^H x_{f,t}}{M} \tag{17}$$

<Step S332>

The frequency-divided observation signals $x_{f,t}$ and the newest provisional powers $\sigma_{f,t}^2$ are input into the reverberation suppression filter estimation unit 332. The reverberation suppression filter estimation unit 332 determines and outputs a reverberation suppression filter $F_{f,t}$ for minimizing the cost function $C_2$ ($F_f$) of equation (7) with respect to t=d, d+1, . . . , d+L−1 in each frequency band.

<Step S333>

The frequency-divided observation signal $x_{f,t}$ and the newest reverberation suppression filter $F_{f,t}$ acquired in step S332 are input into the reverberation suppression filter application unit 333. The reverberation suppression filter application unit 333 acquires and outputs an estimation signal $y'_{f,t}$ by applying the reverberation suppression filter $F_{f,t}$ to the frequency-divided observation signal $x_{f,t}$ in each frequency band. For example, the reverberation suppression filter application unit 333 sets $z_{f,t}$, acquired in accordance with equation (8), as $y'_{f,t}$ and outputs $y'_{f,t}$.

<Step S334>

The newest estimation signal $y'_{f,t}$ acquired in step S333 is input into the steering vector estimation unit 334. Using the estimation signal $y'_{f,t}$, the steering vector estimation unit 334 acquires and outputs a provisional steering vector $v_{f,0}$, which is a provisional vector of the estimated steering vector, in each frequency band. For example, the steering vector estimation unit 334 acquires and outputs the provisional steering vector $v_{f,0}$ for the estimation signal $y'_{f,t}$ in accordance with a steering vector estimation method described in NPL 1 and NPL 2. For example, as the provisional steering vector $v_{f,0}$, the steering vector estimation unit 334 outputs a steering vector estimated using $y'_{f,t}$ as $y_{f,t}$ according to NPL 2. Further, as noted above, a normalized vector acquired by normalizing the transfer function of each element so that the gain of a microphone having any one of the microphone numbers $m_0 \in (1, \ldots, M)$ becomes a constant g may be used as $v_{f,0}$ (equation (5)).

<Step S335>

The newest estimation signal $y'_{f,t}$ acquired in step S333 and the newest provisional steering vector $v_{f,0}$ acquired in step S334 are input into the instantaneous beamformer estimation unit 335. The instantaneous beamformer estimation unit 335 acquires and outputs an instantaneous beamformer $w_{f,0}$ for minimizing $C_1$ ($w_{f,0}$) shown below in equation (18), which is acquired by setting $x_{f,t}=y'_{f,t}$ in equation (2), in each frequency band on the basis of the constraint condition that "$w_{f,0}{}^H v_{f,0}$ is a constant".

$$C_1(w_{f,0}) = \sum_{t=1}^{N} |w_{f,0}{}^H y'_{f,t}|^2 \tag{18}$$

<Step S336>

The newest estimation signal $y'_{f,t}$ acquired in step S333 and the newest instantaneous beamformer $w_{f,0}$ acquired in step S335 are input into the instantaneous beamformer application unit 336. The instantaneous beamformer application unit 336 acquires and outputs an estimation signal $y''_{f,t}$ by applying the instantaneous beamformer $w_{f,0}$ to the estimation signal $y'_{f,t}$ in each frequency band. For example, the instantaneous beamformer application unit 336 acquires and outputs the estimation signal $y''_{f,t}$ as follows.

$$y''_{f,t} = w_{f,0}{}^H y'_{f,t} \tag{19}$$

<Step S331>

The newest estimation signal $y''_{f,t}$ acquired in step S336 is input into the power estimation unit 331. The power estimation unit 331 outputs the power of the estimation signal $y''_{f,t}$ as the provisional power $\sigma_{f,t}^2$ in each frequency band. For example, the power estimation unit 331 generates and outputs the provisional power $\sigma_{f,t}^2$ as follows.

$$\sigma_{f,t}^2 = |y''_{f,t}|^2 = y''_{f,t}{}^H y''_{f,t} \tag{20}$$

<Step S337a>

The control unit 337 determines whether or not a termination condition is satisfied. There are no limitations on the termination condition, but for example, the termination condition may be satisfied when the number of repetitions of the processing of steps S331 to S336 exceeds a predetermined value, when the variation in $\sigma_{f,t}^2$ or $v_{f,0}$ falls to or below a predetermined value after the processing of steps S331 to S336 is performed once, and so on. When the termination condition is not satisfied, the processing returns to step S332. When the termination condition is satisfied, on the other hand, the processing advances to step S337b.

<Step S337b>

In step S337b, the power estimation unit 331 outputs $\sigma_{f,t}^2$ acquired most recently in step S331 as the estimated power of the target signal, and the steering vector estimation unit 334 outputs $v_{f,0}$ acquired most recently in step S334 as the estimated steering vector. As illustrated in FIG. 3, the estimated power $\sigma_{f,t}^2$ is input into the matrix estimation unit 211, and the estimated steering vector $v_{f,0}$ is input into the convolutional beamformer estimation unit 212.

Fourth Embodiment

As described above, the steering vector is estimated on the basis of the frequency-divided observation signal $x_{f,t}$. Here, when the steering vector is estimated after suppressing (preferably, removing) reverberation from the frequency-divided observation signal $x_{f,t}$, the estimation precision improves. In other words, by acquiring a frequency-divided reverberation-suppressed signal in which the reverberation component of the frequency-divided observation signal $x_{f,t}$ has been suppressed, and acquiring the estimated steering vector from the frequency-divided reverberation-suppressed signal, the precision of the estimated steering vector can be improved.

Figure 6:
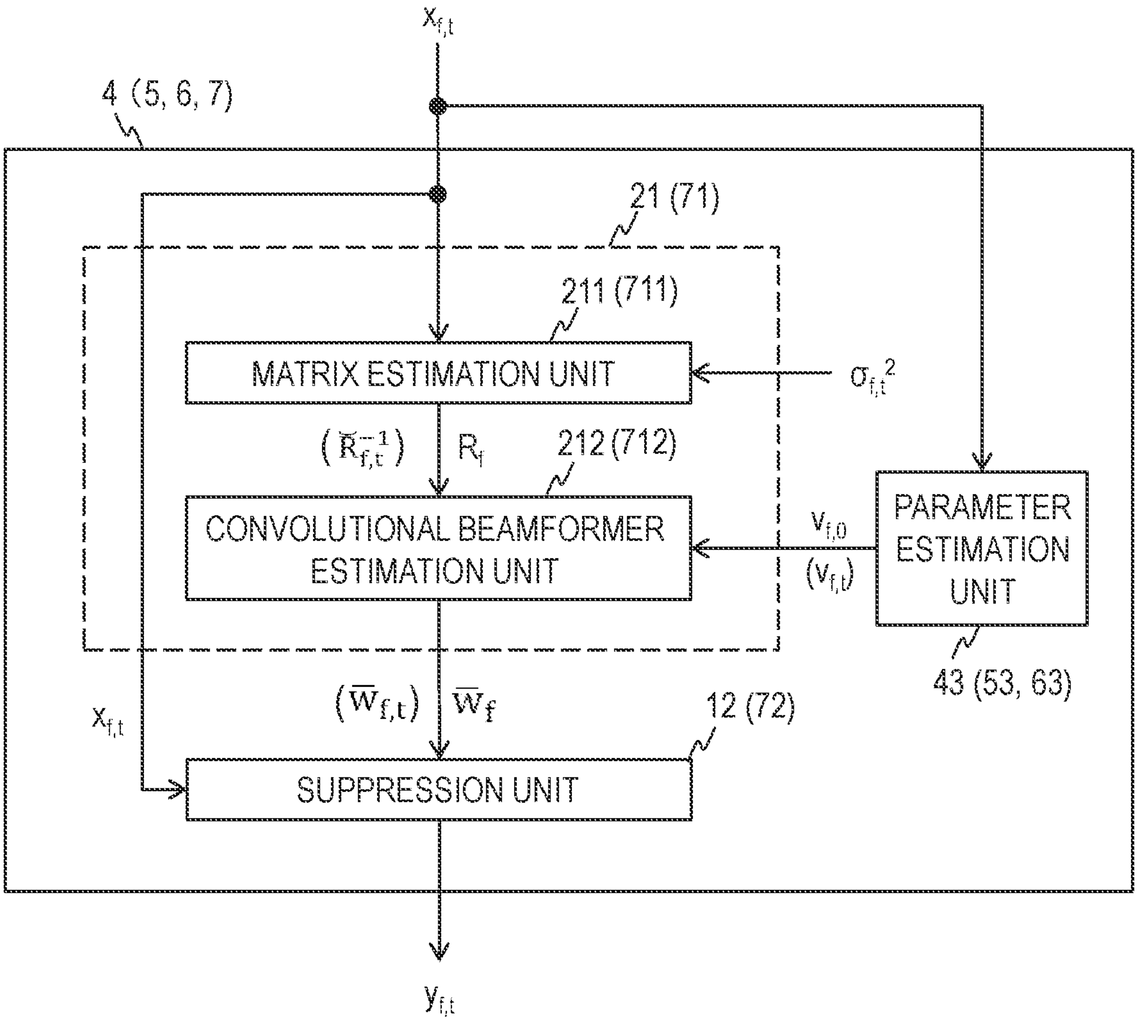
FIG. 6 is a block diagram illustrating an example of a functional configuration of a signal processing device according to fourth to seventh embodiments.
Figure 7:
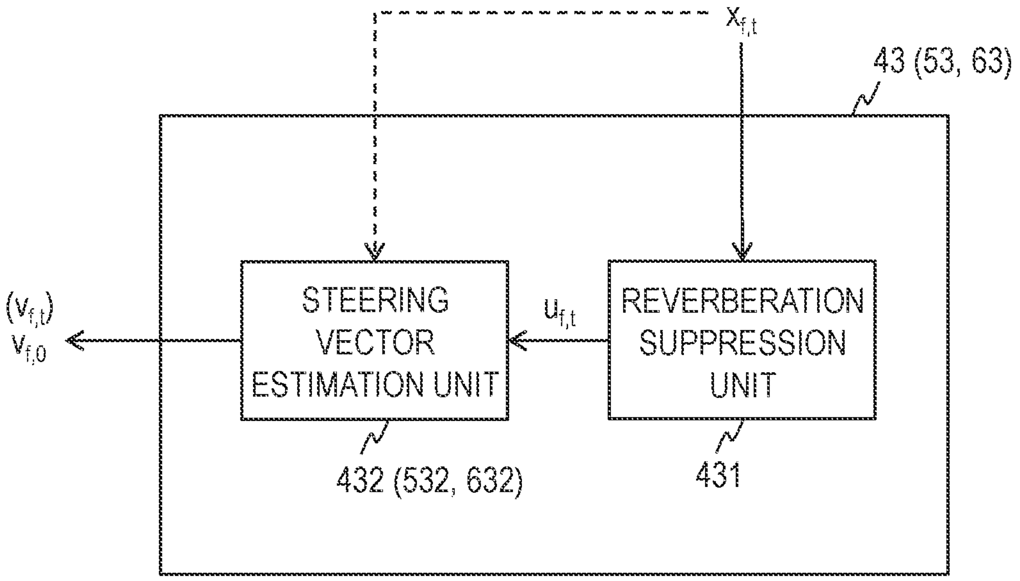
FIG. 7 is a block diagram illustrating an example of a functional configuration of a parameter estimation unit illustrated in FIG. 6.

As illustrated in FIG. 6, a signal processing device 4 according to this embodiment includes the estimation unit 21, the suppression unit 12, and a parameter estimation unit 43. The estimation unit 21 includes the matrix estimation unit 211 and the convolutional beamformer estimation unit 212. As illustrated in FIG. 7, the parameter estimation unit 43 includes a reverberation suppression unit 431 and a steering vector estimation unit 432.

The fourth embodiment differs from the first to third embodiments in that before generating the estimated steering vector, the reverberation component of the frequency-divided observation signal $x_{f,t}$ is suppressed. Hereafter, only a method for generating the estimated steering vector will be described.

<Processing of Reverberation Suppression Unit 431 (Step S431)>

The frequency-divided observation signal $x_{f,t}$ is input into the reverberation suppression unit 431 of the parameter estimation unit 43 (FIG. 7). The reverberation suppression unit 431 acquires and outputs a frequency-divided reverberation-suppressed signal $u_{f,t}$ in which the reverberation component of the frequency-divided observation signal $x_{f,t}$ has been suppressed (preferably, in which the reverberation component of the frequency-divided observation signal $x_{f,t}$ has been removed). There are no limitations on the method for suppressing (removing) the reverberation component from the frequency-divided observation signal $x_{f,t}$, and a well-known reverberation suppression (removal) method may be used. For example, the reverberation suppression unit 431 acquires and outputs the frequency-divided reverberation-suppressed signal $u_{f,t}$ in which the reverberation component of the frequency-divided observation signal $x_{f,t}$ has been suppressed using a method described in reference document 1.

Reference document 1: Takuya Yoshioka and Tomohiro Nakatani, "Generalization of Multi-Channel Linear Prediction Methods for Blind MIMO Impulse Response Shortening," IEEE Transactions on Audio, Speech, and Language Processing (Volume: 20, Issue: 10, December 2012)

<Processing of Steering Vector Estimation Unit 432 (Step S432)>

The frequency-divided reverberation-suppressed signal $u_{f,t}$ acquired by the reverberation suppression unit 431 is input into the steering vector estimation unit 432. Using the frequency-divided reverberation-suppressed signal $u_{f,t}$ as input, the steering vector estimation unit 432 generates and outputs an estimated steering vector serving as an estimated vector of the steering vector. A steering vector estimation processing method of acquiring an estimated steering vector using a frequency-divided time series signal as input is well-known. The steering vector estimation unit 432 acquires and outputs the estimated steering vector $v_{f,0}$ by using the frequency-divided reverberation-suppressed signal $u_{f,t}$ as the input of a desired type of steering vector estimation processing. There are no limitations on the steering vector estimation processing method, and for example, the method described above in NPL 1 and NPL 2, methods described in reference documents 2 and 3, and so on may be used.

Reference document 2: N. Ito, S. Araki, M. Delcroix, and T. Nakatani, "Probabilistic spatial dictionary based online adaptive beamforming for meeting recognition in noise and reverberant environments," Proc IEEE ICASSP, pp. 681-685, 2017.

Reference document 3: S. Markovich-Golan and S. Gannot, "Performance analysis of the covariance subtraction method for relative transfer function estimation and comparison to the covariance whitening method," Proc IEEE ICASSP, pp. 544-548, 2015.

The estimated steering vector $v_{f,0}$ acquired by the steering vector estimation unit 432 is input into the convolutional beamformer estimation unit 212. The convolutional beamformer estimation unit 212 performs the processing of step S212, described in the second embodiment, using the estimated steering vector $v_{f,0}$ and the weighted space-time covariance matrix $R_f$ acquired in step S211. All other processing is as described in the first and second embodiments.

Fifth Embodiment

In a fifth embodiment, a method of executing steering vector estimation by successive processing will be described. In so doing, the estimated steering vector of each time frame number t can be calculated from frequency-divided observation signals $x_{f,t}$ input successively online, for example.

Figure 8:
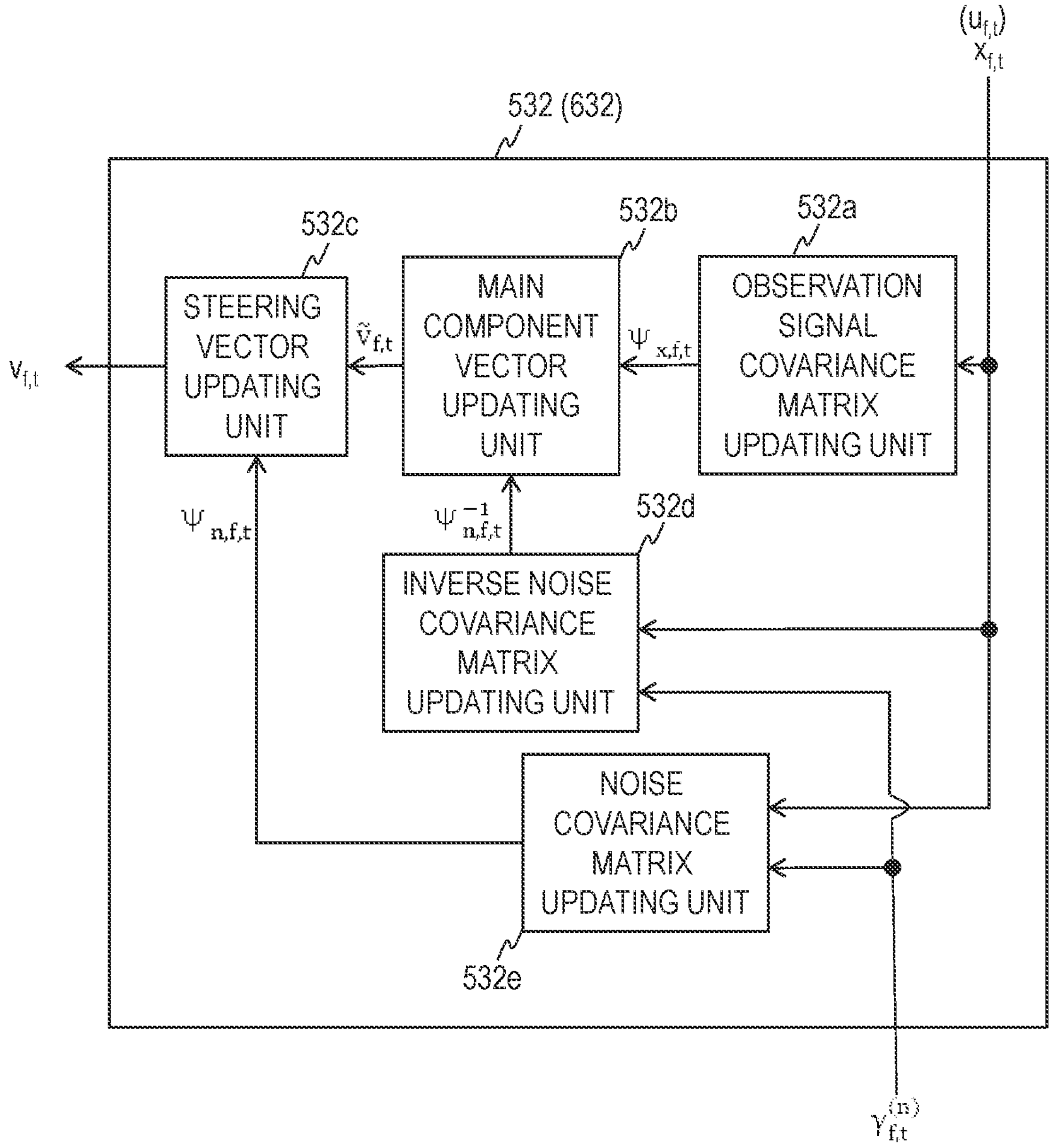
FIG. 8 is a block diagram illustrating an example of a functional configuration of a steering vector estimation unit illustrated in FIG. 7.

As illustrated in FIG. 6, a signal processing device 5 according to this embodiment includes the estimation unit 21, the suppression unit 12, and a parameter estimation unit 53. The estimation unit 21 includes the matrix estimation unit 211 and the convolutional beamformer estimation unit 212. As illustrated in FIG. 7, the parameter estimation unit 53 includes a steering vector estimation unit 532. As illustrated in FIG. 8, the steering vector estimation unit 532 includes an observation signal covariance matrix updating unit 532a, a main component vector updating unit 532b, a steering vector updating unit 532c (the steering vector estimation unit), an inverse noise covariance matrix updating unit 532*d*, and a noise covariance matrix updating unit 532*e*. The fifth embodiment differs from the first to third embodiments only in that the estimated steering vector is generated by successive processing. Hereafter, only a method of generating the estimated steering vector will be described. The following processing is executed on each time frame number t in ascending order from t=1.

<Processing of Steering Vector Estimation Unit 532 (Step S532)>

The frequency-divided observation signal $x_{f,t}$, which is a frequency-divided time series signal, is input into the steering vector estimation unit 532 (FIGS. 7 and 8).

<<Processing of Observation Signal Covariance Matrix Updating Unit 532*a* (Step S532*a*)>>

Using the frequency-divided observation signal $x_{f,t}$ as input, the observation signal covariance matrix updating unit 532*a* (FIG. 8) acquires and outputs a spatial covariance matrix $\psi_{x,f,t}$ of the frequency-divided observation signal $x_{f,t}$ (a spatial covariance matrix of a frequency-divided observation signal belonging to a first time interval), which is based on the frequency-divided observation signal $x_{f,t}$ (the frequency-divided observation signal belonging to the first time interval) and a spatial covariance matrix $\psi_{x,f,t-1}$ of a frequency-divided observation signal $x_{f,t-1}$ (a spatial covariance matrix of a frequency-divided observation signal belonging to a second time interval that is further in the past than the first time interval). For example, the observation signal covariance matrix updating unit 532*a* acquires and outputs a linear sum of a covariance matrix $x_{f,t}x_{f,t}^H$ of the frequency-divided observation signal $x_{f,t}$ (the frequency-divided observation signal belonging to the first time interval) and the spatial covariance matrix $\psi_{x,f,t-1}$ (the spatial covariance matrix of the frequency-divided observation signal belonging to the second time interval that is further in the past than the first time interval) as the spatial covariance matrix $\psi_{x,f,t}$ of the frequency-divided observation signal $x_{f,t}$ (the spatial covariance matrix of the frequency-divided observation signal belonging to the first time interval). The observation signal covariance matrix updating unit 532*a* acquires and outputs the spatial covariance matrix $\psi_{x,f,t}$ in accordance with equation (21) shown below, for example.

$$\psi_{x,f,t}=\beta\psi_{x,f,t-1}+x_{f,t}x_{f,t}^H \tag{21}$$

Here, β is an oblivion coefficient, and is a real number belonging to a range of 0<β<1, for example. An initial matrix $\psi_{x,f,0}$ of the spatial covariance matrix $\psi_{x,f,t-1}$ may be set as desired. For example, an M×M-dimensional unit matrix may be set as the initial matrix $\psi_{x,f,0}$ of the spatial covariance matrix $\gamma_{x,f,t-1}$.

<Processing of Inverse Noise Covariance Matrix Updating Unit 532*d* (Step S532*d*)>

The frequency-divided observation signal $x_{f,t}$ and mask information $\gamma_{f,t}^{(n)}$ are input into the inverse noise covariance matrix updating unit 532*d*. The mask information $\gamma_{f,t}^{(n)}$ is information expressing the ratio of the noise component included in the frequency-divided observation signal $x_{f,t}$ at a time-frequency point corresponding to the time frame number t and the frequency band number f. In other words, the mask information $\gamma_{f,t}^{(n)}$ expresses the occupancy probability of the noise component included in the frequency-divided observation signal $x_{f,t}$ at a time-frequency point corresponding to the time frame number t and the frequency band number f. There are no limitations on the method of estimating the mask information $\gamma_{f,t}^{(n)}$. Methods of estimating the mask information $\gamma_{f,t}^{(n)}$ are well-known, and include, for example, an estimation method using a complex Gaussian mixture model (CGMM) (reference document 4, for example), an estimation method using a neural network (reference document 5, for example), an estimation method integrating these methods (reference document 6 and reference document 7, for example), and so on.

Reference document 4: T. Higuchi, N. Ito, T. Yoshioka, and T. Nakatani, "Robust MVDR beamforming using time-frequency masks for online/offline ASR in noise," Proc IEEE ICASSP-2016, pp. 5210-5214, 2016.

Reference document 5: J. Heymann, L. Drude, and R Haeb-Umbach, "Neural network based spectral mask estimation for acoustic beamforming," Proc IEEE ICASSP-2016, pp. 196-200, 2016.

Reference document 6: T. Nakatani, N. Ito, T. Higuchi, S. Araki, and K. Kinoshita, "Integrating DNN-based and spatial clustering-based mask estimation for robust MVDR beamforming," Proc IEEE ICASSP-2017, pp. 286-290, 2017.

Reference document 7: Y. Matsui, T. Nakatani, M. Delcroix, K. Kinoshita, S. Araki, and S. Makino, "Online integration of DNN-based and spatial clustering-based mask estimation for robust MVDR beamforming," Proc. IWA ENC, pp. 71-75, 2018.

The mask information $\gamma_{f,t}^{(n)}$ may be estimated in advance and stored in a storage device, not illustrated in the figures, or may be estimated successively. Note that the upper right superscript "(n)" of "$\gamma_{f,t}^{(n)}$" should be written directly above the lower right subscript "f, t", but due to notation limitations has been written to the upper right of "f, t".

The inverse noise covariance matrix updating unit 532*d* acquires and outputs an inverse noise covariance matrix $\psi^{-1}{}_{n,f,t}$ (an inverse noise covariance matrix of the frequency-divided observation signal belonging to the first time interval) on the basis of the frequency-divided observation signal $x_{f,t}$ (the frequency-divided observation signal belonging to the first time interval), the mask information $\gamma_{f,t}^{(n)}$ (mask information belonging to the first time interval), and an inverse noise covariance matrix $\psi^{-1}{}_{n,f,t-1}$ (an inverse noise covariance matrix of the frequency-divided observation signal belonging to the second time interval that is further in the past than the first time interval). For example, the inverse noise covariance matrix updating unit 532*d* acquires and outputs the inverse noise covariance matrix $\psi^{-1}{}_{n,f,t}$ in accordance with equation (22), shown below, using the Woodbury formula.

$$\Psi_{n,f,t}^{-2}=\frac{1}{0}\left(\Psi_{n,f,t-1}^{-1}-\frac{Y_{f,t}^{(n)}\Psi_{n,f,t-1}^{-1}x_{f,t}x_{f,t}^H\Psi_{n,f,t-1}^{-1}}{a+Y_{f,t}^{(n)}x_{f,t}^H\Psi_{n,f,t-1}^{-1}x_{f,t}}\right) \tag{22}$$

Here, α is an oblivion coefficient, and is a real number belonging to a range of 0<α<1, for example. An initial matrix $\psi^{-1}{}_{n,f,0}$ of the inverse noise covariance matrix $\psi^{-1}{}_{n,f,t-1}$ may be set as desired. For example, an M×M-dimensional unit matrix may be set as the initial matrix $\psi^{-1}{}_{n,f,0}$ of the inverse noise covariance matrix $\psi^{-1}{}_{n,f,t-1}$. Note that the upper right superscript "−1" of "$\psi^{-1}{}_{n,f,t}$" should be written directly above the lower right subscript "n, f, t", but due to notation limitations has been written to the upper left of "n, f, t".

<Processing of Main Component Vector Updating Unit 532*b* (Step S532*b*)>

The spatial covariance matrix $\psi_{x,f,t}$ acquired by the observation signal covariance matrix updating unit 532*a* and the inverse noise covariance matrix $\psi^{-1}{}_{n,f,t}$ acquired by the inverse noise covariance matrix updating unit 532*d* are input into the main component vector updating unit 532_b_. The main component vector updating unit 532_b_ acquires and outputs a main component vector $v^{\sim}_{f,t}$ (a main component vector of the first time interval) relating to $\psi^{-1}_{n,f,t}\psi_{x,f,t}$ (the product of an inverse matrix of the noise covariance matrix of the frequency-divided observation signal and the spatial covariance matrix of the frequency-divided observation signal belonging to the first time interval) by using a power method on the basis of the inverse noise covariance matrix $\psi^{-1}_{n,f,t}$ (the inverse matrix of the noise covariance matrix of the frequency-divided observation signal), the spatial covariance matrix $\psi_{x,f,t}$ (the spatial covariance matrix of the frequency-divided observation signal belonging to the first time interval), and a main component vector $v^{\sim}_{f,t-1}$ (a main component vector of the second time interval). For example, the main component vector updating unit 532_b_ acquires and outputs a main component vector $v^{\sim}_{f,t}$ based on $\psi^{-1}_{n,f,t}\psi_{x,f,t}v^{\sim}_{f,t-1}$. The main component vector updating unit 532_b_ acquires and outputs the main component vector $v^{\sim}_{f,t}$ in accordance with equations (23) and (24) shown below, for example. Note that the upper right superscript "~" of "$v^{\sim}_{f,t}$" should be written directly above the lower right subscript "v", but due to notation limitations has been written to the upper right of "v".

$$\tilde{v}'_{f,t} = \Psi^{-1}_{n,f,t}\Psi_{x,f,t}\tilde{v}_{f,t-1} \tag{23}$$

$$\tilde{v}_{f,t} = \frac{\tilde{v}'_{f,t}}{\tilde{v}^{ref}_{f,t}} \tag{24}$$

Here, $v^{\sim}_{f,t}{}^{ref}$ expresses an element corresponding to a predetermined microphone (a reference microphone ref) serving as a reference, among the M elements of a vector $v^{\sim}_{f,t}$ acquired from equation (23). In other words, in the example of equations (23) and (24), the main component vector updating unit 532_b_ sets a vector acquired by normalizing the respective elements of $v^{\sim'}_{f,t}=\psi^{-1}_{n,f,f,t}\psi_{x,f,t}v^{\sim}_{f,t-1}$ by $v^{\sim}_{f,t}{}^{ref}$ as the main component vector $v^{\sim}_{f,t}$. Note that the upper right superscript "~" of "$v^{\sim}_{f,t}$" should be written directly above the lower right subscript "v", but due to notation limitations has been written to the upper right of "v".

<Noise Covariance Matrix Updating Unit 532_e_ (Step S532_e_)>

The noise covariance matrix updating unit 532_e_, using the frequency-divided observation signal $x_{f,t}$ (the frequency-divided observation signal belonging to the first time interval) and the mask information $\gamma_{f,t}^{(n)}$; (the mask information of the first time interval) as input, acquires and outputs a noise covariance matrix $\gamma_{n,f,t}$ of the frequency-divided observation signal $x_{f,t}$ (a noise covariance matrix of the frequency-divided observation signal belonging to the first time interval), which is based on the frequency-divided observation signal $x_{f,t}$, the mask information $\gamma_{f,t}^{(n)}$, and a noise covariance matrix $\psi_{n,f,t-1}$ (a noise covariance matrix of the frequency-divided observation signal belonging to the second time interval that is further in the past than the first time interval). For example, the noise covariance matrix updating unit 532_e_ acquires and outputs the linear sum of a product $\gamma_{f,t}^{(n)}x_{f,t}x_{f,t}^H$ of the covariance matrix $x_{f,t}x_{f,t}^H$ of the frequency-divided observation signal $x_{f,t}$ and the mask information $\gamma_{f,t}^{(n)}$, and the noise covariance matrix $\psi_{n,f,t-1}$ (the noise covariance matrix of the frequency-divided observation signal belonging to the second time interval that is further in the past than the first time interval) as the noise covariance matrix $\psi_{n,f,t}$ of the frequency-divided observation signal $x_{f,t}$. For example, the noise covariance matrix updating unit 532_e_ acquires and outputs the noise covariance matrix $\psi_{n,f,t}$ in accordance with equation (25) shown below.

$$\psi_{n,f,t}=\alpha\psi_{n,f,t-1}+\gamma_{f,t}^{(n)}x_{f,t}x_{f,t}^H \tag{25}$$

Here, $\alpha$ is an oblivion coefficient, and is a real number belonging to a range of $0<\alpha<1$, for example.

<Steering Vector Updating Unit 532_c_ (Step S532_c_)>

The steering vector updating unit 532_c_, using the main component vector $v^{\sim}_{f,t}$ (the main component vector of the first time interval) acquired by the main component vector updating unit 532_b_ and the noise covariance matrix $\psi_{n,f,t}$ (the noise covariance matrix of the frequency-divided observation signal) acquired by the noise covariance matrix updating unit 532_e_ as input, acquires and outputs an estimated steering vector $v_{f,t}$ (an estimated steering vector of the first time interval) on the basis thereof. For example, the steering vector updating unit 532_c_ acquires and outputs an estimated steering vector $v_{f,t}$ based on $\psi_{n,f,t}v^{\sim}_{f,t}$. The steering vector updating unit 532_c_ acquires and outputs the estimated steering vector $v_{f,t}$ in accordance with equations (26) and (27) shown below, for example.

$$v'_{f,t}=\psi_{n,f,t}\tilde{v}_{f,t} \tag{26}$$

$$v_{f,t} = \frac{v'_{f,t}}{v^{ref}_{f,t}} \tag{27}$$

Here, $v_{f,t}{}^{ref}$ expresses an element corresponding to the reference microphone ref, among the M elements of a vector $v'_{f,t}$ acquired from equation (26). In other words, in the example of equations (26) and (27), the steering vector updating unit 532_c_ sets a vector acquired by normalizing the respective elements of $v'_{f,t}=\psi_{n,f,t}v^{\sim}_{f,t}$ by $v_{f,t}{}^{ref}$ as the estimated steering vector $v_{f,t}$.

The estimated steering vector $v_{f,t}$ acquired by the steering vector estimation unit 532 is input into the convolutional beamformer estimation unit 212. The convolutional beamformer estimation unit 212 treats the estimated steering vector $v_{f,t}$ as $v_{f,0}$, and performs the processing of step S212, described in the second embodiment, using the estimated steering vector $v_{f,t}$ and the weighted space-time covariance matrix $R_f$ acquired in step S211. All other processing is as described in the first and second embodiments. Further, as $\sigma_{f,t}^2$ input into the matrix estimation unit 211, either the provisional power generated as illustrated in equation (17) or the estimated power $\sigma_{f,t}^2$ generated as described in the third embodiment, for example, may be used.

Modified Example 1 of Fifth Embodiment

In step S532_d_ of the fifth embodiment, the inverse noise covariance matrix updating unit 532_d_ adaptively updates the inverse noise covariance matrix $\psi^{-1}_{n,f,t}$ at each time point corresponding to the time frame number t by using the frequency-divided observation signal $x_{f,t}$ and the mask information $\gamma_{f,t}^{(n)}$. However, the inverse noise covariance matrix updating unit 532_d_ may acquire and output the inverse noise covariance matrix $\psi^{-1}_{n,f,t}$ by using a frequency-divided observation signal $x_{f,t}$ of a time interval in which the noise component either exists alone or is dominant, without using the mask information $\gamma_{f,t}^{(n)}$. For example, the inverse noise covariance matrix updating unit 532_d_ may output, as the inverse noise covariance matrix $\psi^{-1}_{n,f,t}$, an inverse matrix of the temporal average of $x_{f,t}x_{f,t}^H$ with respect to a frequency-divided observation signal $x_{f,t}$ of a time interval in which the noise component either exists alone or is dominant. The inverse noise covariance matrix $\psi^{-1}_{n,f,t}$ acquired in this manner is used continuously in the frames having the respective time frame numbers t.

In step S532*e* of the fifth embodiment, the noise covariance matrix updating unit 532*e* may acquire and output the noise covariance matrix $\psi^{-1}_{n,f,t}$ of the frequency-divided observation signal $x_{f,t}$ using a frequency-divided observation signal $x_{f,t}$ of a time interval in which the noise component either exists alone or is dominant, without using the mask information $\gamma_{f,t}^{(n)}$. For example, the noise covariance matrix updating unit 532*e* may output, as the noise covariance matrix $\psi_{n,f,t}$, the temporal average of $x_{f,t}x_{f,t}^H$ with respect to a frequency-divided observation signal $x_{f,t}$ of a time interval in which the noise component either exists alone or is dominant. The noise covariance matrix $\psi_{n,f,t}$ acquired in this manner is used continuously in the frames having the respective time frame numbers t.

Modified Example 2 of Fifth Embodiment

In the fifth embodiment and the modified example thereof, a case in which the first time interval is the frame having the time frame number t and the second time interval is the frame having the time frame number t−1 was used as an example, but the present invention is not limited thereto. A frame having a time frame number other than the time frame number t may be set as the first time interval, and a time frame that is further in the past than the first time interval and has a time frame number other than the time frame number t−1 may be set as the second time interval.

Sixth Embodiment

In the fifth embodiment, the steering vector estimation unit 532 acquires and outputs the estimated steering vector $\nu_{f,t}$ by successive processing using the frequency-divided observation signal $x_{f,t}$ as input. As noted in the fourth embodiment, however, by estimating the steering vector after suppressing reverberation from the frequency-divided observation signal $x_{f,t}$, the estimation precision is improved. In the sixth embodiment, an example in which the steering vector estimation unit acquires and outputs the estimated steering vector $\nu_{f,t}$ by successive processing, as described in the fifth embodiment, after reverberation has been suppressed from the frequency-divided observation signal $x_{f,t}$ will be described.

As illustrated in FIG. 6, a signal processing device 6 according to this embodiment includes the estimation unit 21, the suppression unit 12, and a parameter estimation unit 63. As illustrated in FIG. 7, the parameter estimation unit 63 includes the reverberation suppression unit 431 and a steering vector estimation unit 632. The sixth embodiment differs from the fifth embodiment in that before generating the estimated steering vector, the reverberation component of the frequency-divided observation signal $x_{f,t}$ is suppressed. Hereafter, only a method of generating the estimated steering vector will be described.

<Processing of Reverberation Suppression Unit 431 (Step S431)>

As described in the fourth embodiment, the reverberation suppression unit 431 (FIG. 7) acquires and outputs the frequency-divided reverberation-suppressed signal $u_{f,t}$ in which the reverberation component of the frequency-divided observation signal $x_{f,t}$ has been suppressed (preferably, in which the reverberation component of the frequency-divided observation signal $x_{f,t}$ has been removed).

<Processing of Steering Vector Estimation Unit 632 (Step S632)>

The frequency-divided reverberation-suppressed signal $u_{f,t}$ is input into the steering vector estimation unit 632. The processing of the steering vector estimation unit 632 is identical to the processing of the steering vector estimation unit 532 of the fifth embodiment except that the frequency-divided reverberation-suppressed signal $u_{f,t}$, rather than the frequency-divided observation signal $x_{f,t}$, is input into the steering vector estimation unit 632, and the steering vector estimation unit 632 uses the frequency-divided reverberation-suppressed signal $u_{f,t}$ instead of the frequency-divided observation signal $x_{f,t}$. In other words, in the processing performed by the steering vector estimation unit 63 the frequency-divided observation signal $x_{f,t}$ used in the processing of the steering vector estimation unit 532 is replaced by the frequency-divided reverberation-suppressed signal $u_{f,t}$. All other processing is identical to the fifth embodiment and the modified example thereof. More specifically, the frequency-divided reverberation-suppressed signal $u_{f,t}$, which is a frequency-divided time series signal, is input into the steering vector estimation unit 632. The observation signal covariance matrix updating unit 532*a* acquires and outputs the spatial covariance matrix $\psi_{x,f,t}$ of the frequency-divided reverberation-suppressed signal $u_{f,t}$ belonging to the first time interval, which is based on the frequency-divided reverberation-suppressed signal $u_{f,t}$ belonging to the first time interval and the spatial covariance matrix $\psi_{x,f,t-1}$ of a frequency-divided reverberation-suppressed signal $u_{f,t-1}$ belonging to the second time interval that is further in the past than the first time interval. The main component vector updating unit 532*b* acquires and outputs the main component vector $\tilde{v}_{f,t}$ of the first time interval with respect to the product $\psi^{-1}_{n,f,t}\psi_{x,f,t}$ of the inverse matrix $\psi^{-1}_{n,f,t}$ of the noise covariance matrix of the frequency-divided reverberation-suppressed signal and the spatial covariance matrix $\psi_{x,f,t}$ of the frequency-divided reliability-suppressed signal belonging to the first time interval on the basis of the inverse matrix $\psi^{-1}_{n,f,t}$ of the noise covariance matrix of the frequency-divided reliability-suppressed signal $u_{f,t}$, the spatial covariance matrix $\psi_{x,f,t}$ of the frequency-divided reliability-suppressed signal belonging to the first time interval, and the main component vector $\tilde{v}_{f,t-1}$ of the second time interval. The steering vector updating unit 532*c* acquires and outputs the estimated steering vector $\nu_{f,t}$ of the first time interval on the basis of the noise covariance matrix of the frequency-divided reverberation-suppressed signal $u_{f,t}$ and the main component vector $\tilde{v}_{f,t}$ of the first time interval.

Seventh Embodiment

In a seventh embodiment, a method of estimating the convolutional beamformer by successive processing will be described. In so doing, the convolutional beamformer of each time frame number t can be estimated and the estimation signal of the target signal $y_{f,t}$ can be acquired from frequency-divided observation signals $x_{f,t}$ input successively online, for example.

As illustrated in FIG. 6, a signal processing device 7 according to this embodiment includes an estimation unit 71, a suppression unit 72, and the parameter estimation unit 53. The estimation unit 71 includes a matrix estimation unit 711 and a convolutional beamformer estimation unit 712.

The following processing is executed on each time frame number t in ascending order from t=1.

<Processing of Parameter Estimation Unit 53 (Step S53)>

The frequency-divided observation signal $x_{f,t}$ is input into the parameter estimation unit 53 (FIGS. 6 and 7). As described in the fifth embodiment, the steering vector estimation unit 532 (FIG. 8) of the parameter estimation unit 53 acquires and outputs the estimated steering vector $\nu_{f,t}$ by successive processing using the frequency-divided observation signal $x_{f,t}$ as input (step S532). The estimated steering vector $\nu_{f,t}$ is represented by the following M-dimensional vector.

$$\nu_{f,t}=[\nu_{f,t}^{(1)},\nu_{f,t}^{(2)},\ldots,\nu_{f,t}^{(M)}]^T$$

Here, $\nu_{f,t}^{(m)}$ represents an element corresponding to the microphone having the microphone number m, among the M elements of the estimated steering vector $\nu_{f,t}$. The estimated steering vector $\nu_{f,t}$ acquired by the steering vector estimation unit 532 is input into the convolutional beamformer estimation unit 712.

<Processing of Matrix Estimation Unit 711 (Step S711)>

The frequency-divided observation signal $x_{f,t}$ and the power or estimated power $\sigma_{f,t}^2$ of the target signal are input into the matrix estimation unit 711 (FIG. 6). As $\sigma_{f,t}^2$ input into the matrix estimation unit 711, either the provisional power generated as illustrated in equation (17) or the estimated power $\sigma_{f,t}^2$ generated as described in the third embodiment, for example, may be used. On the basis of the frequency-divided observation signal $x_{f,t}$ (the frequency-divided observation signal belonging to the first time interval), the power or estimated power $\sigma_{f,t}^2$ of the target signal (the power or estimated power of the frequency-divided observation signal belonging to the first time interval), and an inverse matrix $$\breve{R}_{f,t-1}^{-1}$$

of a space-time covariance matrix (an inverse matrix of the space-time covariance matrix of the second time interval that is further in the past than the first time interval), the matrix estimation unit 711 estimates and outputs an inverse matrix $$\breve{R}_{f,t}^{-1}$$

of a space-time covariance matrix (an inverse matrix of the space-time covariance matrix of the first time interval). An example of the space-time covariance matrix is as follows.

$$\breve{R}_{f,t}=\sum_{\tau=0}^{t}\frac{\alpha^{t-\tau}}{\sigma_{f,\tau}^2}\bar{x}_{f,t}\bar{x}_{f,t}^H$$

In this case, the matrix estimation unit 711 generates and outputs the inverse matrix $$\breve{R}_{f,t}^{-1}$$

of the space-time covariance matrix in accordance with equations (28) and (29) shown below, for example.

$$k_{f,t}=\frac{\breve{R}_{f,t-1}^{-1}\bar{x}_{f,t}}{\alpha\sigma_{f,t}^2+\bar{x}_{f,t}^H\breve{R}_{f,t-1}^{-1}\bar{x}_{f,t}} \quad (28)$$

$$\breve{R}_{f,t}^{-1}=\frac{1}{\alpha}\left(\breve{R}_{f,t-1}^{-1}-k_{f,t}\bar{x}_{f,t}^H\breve{R}_{f,t-1}^{-1}\right) \quad (29)$$

Here, $k_{f,t}$ in equation (28) is an (L+1)M-dimensional vector, and the inverse matrix of equation (29) is an (L+1)M×(L+1)M matrix. α is an oblivion coefficient, and is a real number belonging to a range of 0<α<1, for example. Further, an initial matrix of the inverse matrix $$\breve{R}_{f,t-1}^{-1}$$

of the space-time covariance matrix may be set as desired, and an example of the initial matrix is an (L+1)M-dimensional unit matrix shown below.

$$\breve{R}_{f,0}^{-1}=I_{(L+1)M}$$

<Processing of beamformer estimation unit 712 (step S712)>

$$\breve{R}_{f,t}^{-1}$$

(the inverse matrix of the space-time covariance matrix of the first time interval) acquired by the matrix estimation unit 711, and the estimated steering vector $\nu_{f,t}$ acquired by the parameter estimation unit 53 are input into the beamformer estimation unit 712. The convolutional beamformer estimation unit 712 acquires and outputs the convolutional beamformer $\bar{w}_{f,t}$ (the convolutional beamformer of the first time interval) on the basis thereof. For example, the convolutional beamformer estimation unit 712 acquires and outputs the convolutional beamformer $\bar{w}_{f,t}$ in accordance with equation (30), shown below.

$$\bar{w}_{f,t}=\frac{\breve{R}_{f,t}^{-1}\bar{v}_{f,t}}{\bar{v}_{f,t}^H\breve{R}_{f,t}^{-1}\bar{v}_{f,t}} \quad (30)$$

where $$\bar{v}_{f,t}=[\bar{v}_{f,t}^{(1)},\bar{v}_{f,t}^{(2)},\ldots,\bar{v}_{f,t}^{(M)}]$$

and $$\bar{v}_{f,t}^{(m)}=[g_f v_{f,t}^{(m)},0,\ldots,0]$$

$$[g_f v_{f,t}^{(m)},0,\ldots,0]$$

is an L+1-dimensional vector. $g_f$ is a scalar constant other than 0.

<Processing of Suppression Unit 72 (Step S72)>

The frequency-divided observation signal $x_{f,t}$ and the convolutional beamformer $\bar{w}_{f,t}$ acquired by the beamformer estimation unit 712 are input into the suppression unit 72. The suppression unit 72 acquires and outputs the estimation signal of the target signal $y_{f,t}$ by applying the convolutional beamformer $\bar{w}_{f,t}$ to the frequency-divided observation signal $x_{f,t}$ in each time frame number t and frequency band number f. For example, the suppression unit 72 acquires and outputs the estimation signal of the target signal $y_{f,t}$ in accordance with equation (31) shown below.

$$y_{f,t}=\bar{w}_{f,t}{}^{H}\bar{x}_{f,t} \tag{31}$$

Modified Example 1 of Seventh Embodiment

The parameter estimation unit 53 of the signal processing device 7 according to the seventh embodiment may be replaced by the parameter estimation unit 63. In other words, in the seventh embodiment, the parameter estimation unit 63, rather than the parameter estimation unit 53, may acquire and output the estimated steering vector $\nu_{f,t}$ by successive processing, as described in the sixth embodiment, using the frequency-divided observation signal $x_{f,t}$ as input.

Modified Example 2 of Seventh Embodiment

In the seventh embodiment and the modified example thereof, a case in which the first time interval is the frame having the time frame number t and the second time interval is the frame having the time frame number t−1 was used as an example, but the present invention is not limited thereto. A frame having a time frame number other than the time frame number t may be set as the first time interval, and a time frame that is further in the past than the first time interval and has a time frame number other than the time frame number t−1 may be set as the second time interval.

Eighth Embodiment

In the second embodiment, an example in which the analytical solution of $\bar{w}_f$ for minimizing the cost function $C_3$ ($\bar{w}_f$) on the basis of a constraint condition in which $w_{f,0}{}^{H}\nu_{f,0}$ is a constant is viewed as equation (15) and the convolutional beamformer $\bar{w}_f$ is acquired in accordance with equation (15) was described. In an eighth embodiment, an example in which the convolutional beamformer is acquired using a different optimal solution will be described.

When an (M−1)×M block matrix corresponding to the orthogonal complement of the estimated steering vector $\nu_{f,0}$ is set as $B_f$, $B_f{}^{H}\nu_{f,0}=0$ is satisfied. An infinite number of block matrices $B_f$ of this type exist. Equation (32) below shows an example of the block matrix $B_f$.

$$B_f^H=\left[\frac{-\nu_{f,0}^{-}}{\nu_{f,0}^{ref}},\, I_{M-1}\right] \tag{32}$$

Here, $\nu^{\sim}_{f,0}$ is an M−1-dimensional column vector constituted by elements of the steering vector $\nu_{f,0}$ or the estimated steering vector $\nu_{f,0}$ that correspond to microphones other than the reference microphone ref, $\nu_{f,0}{}^{ref}$ is the element of $\nu_{f,0}$ that corresponds to the reference microphone ref, and $I_{M-1}$ is an (M−1)×(M−1)-dimensional unit matrix.

$g_f$ is set as a scalar constant other than 0, $a_{f,0}$ is set as an M-dimensional modified instantaneous beamformer, and the instantaneous beamformer $w_{f,0}$ is expressed as the sum of a constant multiple $g_f\nu_{f,0}$ of the steering vector $\nu_{f,0}$ or a constant multiple $g_f\nu_{f,0}$ of the estimated steering vector $\nu_{f,0}$ and a product $B_f a_{f,0}$ of the block matrix $B_f$ corresponding to the orthogonal complement of the steering vector $\nu_{f,0}$ or the estimated steering vector $\nu_{f,0}$ and the modified instantaneous beamformer $a_{f,0}$. In other words, the instantaneous beamformer $w_{f,0}$ is expressed as $$w_{f,0}=g_f\nu_{f,0}+B_f a_{f,0} \tag{33}$$

Accordingly, $B_f{}^{H}\nu_{f,0}=0$, and therefore the constraint condition that "$w_{f,0}{}^{H}\nu_{f,0}$ is a constant" is expressed as follows.

$$w_{f,0}{}^{H}\nu_{f,0}=(g_f\nu_{f,0}+B_f a_{f,0})^{H}\nu_{f,0}=g_f{}^{H}|\|_{f,0}|2=\text{constant}$$

Hence, even under the definition given in equation (33), the constraint condition that "$w_{f,0}{}^{H}\nu_{f,0}$ is a constant" is satisfied in relation to any modified instantaneous beamformer $a_{f,0}$. It is therefore evident that the instantaneous beamformer $w_{f,0}$ may be defined as illustrated in equation (33). In this embodiment, the convolutional beamformer is estimated using the optimal solution of the convolutional beamformer acquired when the instantaneous beamformer $w_{f,0}$ is defined as illustrated in equation (33). This will be described in detail below.

Figure 9:
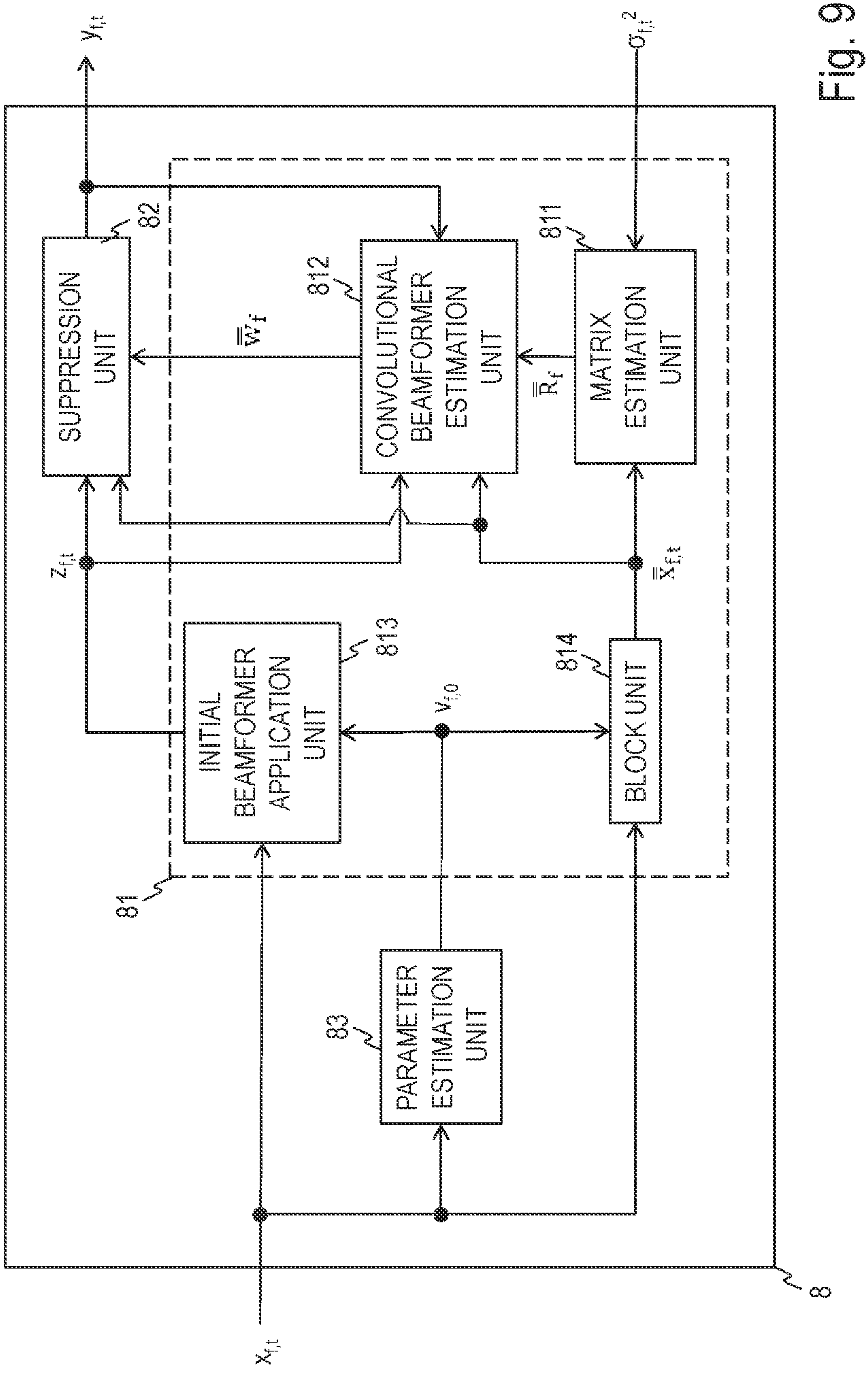
FIG. 9 is a block diagram illustrating an example of a functional configuration of a signal processing device according to an eighth embodiment.

As illustrated in FIG. 9, a signal processing device 8 according to this embodiment includes an estimation unit 81, a suppression unit 82, and a parameter estimation unit 83. The estimation unit 81 includes a matrix estimation unit 811, a convolutional beamformer estimation unit 812, an initial beamformer application unit 813, and a block unit 814.

<Processing of Parameter Estimation Unit 83 (Step S83)>

The parameter estimation unit 83 (FIG. 9), using the frequency-divided observation signal $x_{f,t}$ as input, acquires the estimated steering vector by an identical method to any of the parameter estimation units 33, 43, 53, 63 described above, and outputs the acquired estimated steering vector as $\nu_{f,0}$. The output estimated steering vector $\nu_{f,0}$ is transmitted to the initial beamformer application unit 813 and the block unit 814.

<Processing of Initial Beamformer Application Unit 813 (Step S813)>

The estimated steering vector $\nu_{f,0}$ and the frequency-divided observation signal $x_{f,t}$ are input into the initial beamformer application unit 813. The initial beamformer application unit 813 acquires and outputs an initial beamformer output $z_{f,t}$ (an initial beamformer output of the first time interval) based on the estimated steering vector $\nu_{f,0}$ and the frequency-divided observation signal $x_{f,t}$ (the frequency-divided observation signal belonging to the first time interval). For example, the initial beamformer application unit 813 acquires and outputs an initial beamformer output $z_{f,t}$ based on the constant multiple of the estimated steering vector $\nu_{f,0}$ and the frequency-divided observation signal $r_{f,t}$. The initial beamformer application unit 813 acquires and outputs the initial beamformer output $z_{f,t}$ in accordance with equation (34) shown below, for example.

$$z_{f,t}=(g_f\nu_{f,0})^{H}x_{f,t} \tag{34}$$

The output initial beamformer output $z_{f,t}$ is transmitted to the convolutional beamformer estimation unit 812 and the suppression unit 82.

<Processing of Block Unit 814 (Step S814)>

The estimated steering vector $\nu_{f,0}$ and the frequency-divided observation signal $x_{f,t}$ are input into the block unit 814. The block unit 814 acquires and outputs a vector $\bar{x}_{f,t}$ based on the frequency-divided observation signal $x_{f,t}$ and the block matrix $B_f$ corresponding to the orthogonal complement of the estimated steering vector $v_{f,0}$. As noted above, $B_f^H v_{f,0}=0$ is satisfied. Equation (32) shows an example of the block matrix $B_f$, but the present invention is not limited to this example, and any block matrix $B_f$ in which $B_f^H v_{f,0}=0$ is satisfied may be used. The block unit 814 acquires and outputs the vector $x^{=}_{f,t}$ in accordance with equations (35) and (36) shown below, for example.

$$\overline{\overline{x}}^{(m)}_{f,t-d} = \left[x^{(m)}_{f,t-d}, x^{(m)}_{f,t-d-1}, \ldots, x^{(m)}_{f,t-d-L+1}\right]^T \tag{35}$$

$$\overline{\overline{x}}_{f,t} = \left[\left(B_f^H x_{f,t}\right)^T, \overline{\overline{x}}^{(1)\,T}_{f,t-d}, \overline{\overline{x}}^{(2)\,T}_{f,t-d}, \ldots, \overline{\overline{x}}^{(M)\,T}_{f,t-d}\right]^T \tag{36}$$

Note that the upper right superscript "=" of "$x^{=}_{f,t}$" should be written directly above the lower right subscript "x", as shown in equation (36), but due to notation limitations may also be written to the upper right of "x". The output vector $x^{=}_{f,t}$ is transmitted to the matrix estimation unit 811, the convolutional beamformer estimation unit 812, and the suppression unit 82. Further, when L=0, the right side of equation (35) becomes a vector in which the number of elements is 0 (an empty vector), whereby equation (36) is as shown below in equation (36A).

$$\overline{\overline{x}}_{f,t}=B_f^H x_{f,t} \tag{36A}$$

<Processing of Matrix Estimation Unit 811 (Step S811)>

The vector $x?_{f,t}$ acquired by the block unit 814 and the power or estimated power $\sigma_{f,t}^2$ of the target signal are input into the matrix estimation unit 811. Either the provisional power generated as illustrated in equation (17) or the estimated power $\sigma_{f,t}^2$ generated as described in the third embodiment, for example, may be used as $\sigma_{f,t}^2$. Using the vector $x^{=}_{f,t}$ and the power or estimated power $\sigma_{f,t}^2$ of the target signal, the matrix estimation unit 811 acquires and outputs a weighted modified space-time covariance matrix $R^{=}_f$, which is based on the estimated steering vector $v_{f,0}$, the frequency-divided observation signal $x_{f,t}$, and the power or estimated power $\sigma_{f,t}^2$ of the target signal and increases the probability expressing the speech-likeness of the estimation signal when the instantaneous beamformer $w_{f,0}$ is expressed as illustrated in equation (33). For example, the matrix estimation unit 811 acquires and outputs a weighted modified space-time covariance matrix $R^{=}_f$ based on the vector $x^{=}_{f,t}$, and the power or estimated power $\sigma_{f,t}^2$ of the target signal. The matrix estimation unit 811 acquires and outputs the weighted modified space-time covariance matrix $R^{=}_f$ in accordance with equation (37) below, for example.

$$\overline{\overline{R}}_f = \sum_{t=1}^{N} \frac{\overline{\overline{x}}_{f,t}\overline{\overline{x}}^H_{f,t}}{\sigma^2_{f,t}} \tag{37}$$

The output weighted modified space-time covariance matrix $R^{=}_f$ is transmitted to the convolutional beamformer estimation unit 812.

<Processing of Convolutional Beamformer Estimation Unit 812 (Step S812)>

The initial beamformer output $z_{f,t}$ acquired by the initial beamformer application unit 813, the vector $x^{=}_{f,t}$ acquired by the block unit 814, and the weighted modified space-time covariance matrix $R^{=}_f$ acquired by the matrix estimation unit 811 are input into the convolutional beamformer estimation unit 812. Using these, the convolutional beamformer estimation unit 812 acquires and outputs a convolutional beamformer $w^{=}_f$ that is based on the estimated steering vector $v_{f,t}$, the weighted modified space-time covariance matrix $R^{=}_f$, and the frequency-divided observation signal $x_{f,t}$. For example, the convolutional beamformer estimation unit 812 acquires and outputs the convolutional beamformer $w^{=}_f$ in accordance with equation (38) shown below.

$$\overline{\overline{w}}_f = \overline{\overline{R}}_f^{-1}\overline{\overline{x}}_{f,t} z^H_{f,t} \tag{38}$$

$$\overline{\overline{w}}_f = \left[a^T_{f,0}, w_f^{(1)^T}, w_f^{(2)^T}, \ldots, w_f^{(M)^T}\right]^T \tag{38A}$$

$$\overline{\overline{w}}^{(m)}_f = \left[w^{(m)}_{f,d}, w^{(m)}_{f,d+1}, \ldots, w^{(m)}_{f,d+L-1}\right]^T \tag{38B}$$

The output convolutional beamformer $w^{=}_f$ is transmitted to the suppression unit 82.

Note that when L=0, the right side of equation (38B) becomes a vector in which the number of elements is 0 (an empty vector), whereby equation (38A) is as shown below.

$$\overline{\overline{w}}_f=a_{f,0}$$

<Processing of Suppression Unit 82 (Step S82)>

The vector $x^{=}_{f,t}$ output from the block unit 814, the initial beamformer output $z_{f,t}$ output from the initial beamformer application unit 813, and the convolutional beamformer $w^{=}_f$ output from the convolutional beamformer estimation unit 812 are input into the suppression unit 82. The suppression unit 82 acquires and outputs the estimation signal of the target signal $y_{f,t}$ by applying the initial beamformer output $z_{f,t}$ and the convolutional beamformer $w^{=}_f$ to the vector $x^{=}_{f,t}$. This processing is equivalent to processing for acquiring and outputting the estimation signal of the target signal $y_{f,t}$ by applying the convolutional beamformer $w^{-}_f$ to the frequency-divided observation signal $x_{f,t}$. For example, the suppression unit 82 acquires and outputs the estimation signal of the target signal $y_{f,t}$ in accordance with equation (39) shown below.

$$y_{f,t}=z_{f,t}+\overline{\overline{w}}_f^H\overline{\overline{x}}_{f,t} \tag{39}$$

Modified Example 1 of Eighth Embodiment

A known steering vector $v_{f,0}$ acquired on the basis of actual measurement or the like may be input into the initial beamformer application unit 813 and the block unit 814 instead of the estimated steering vector $v_{f,0}$ acquired by the parameter estimation unit 83. In this case, the initial beamformer application unit 813 and the block unit 814 perform steps S813 and S814, described above, using the steering vector $v_{f,0}$ instead of the estimated steering vector $v_{f,0}$.

Ninth Embodiment

In a ninth embodiment, a method for executing convolutional beamformer estimation based on the eighth embodiment by successive processing will be described. The following processing is executed on each time frame number t in ascending order from t=1.

Figure 10:
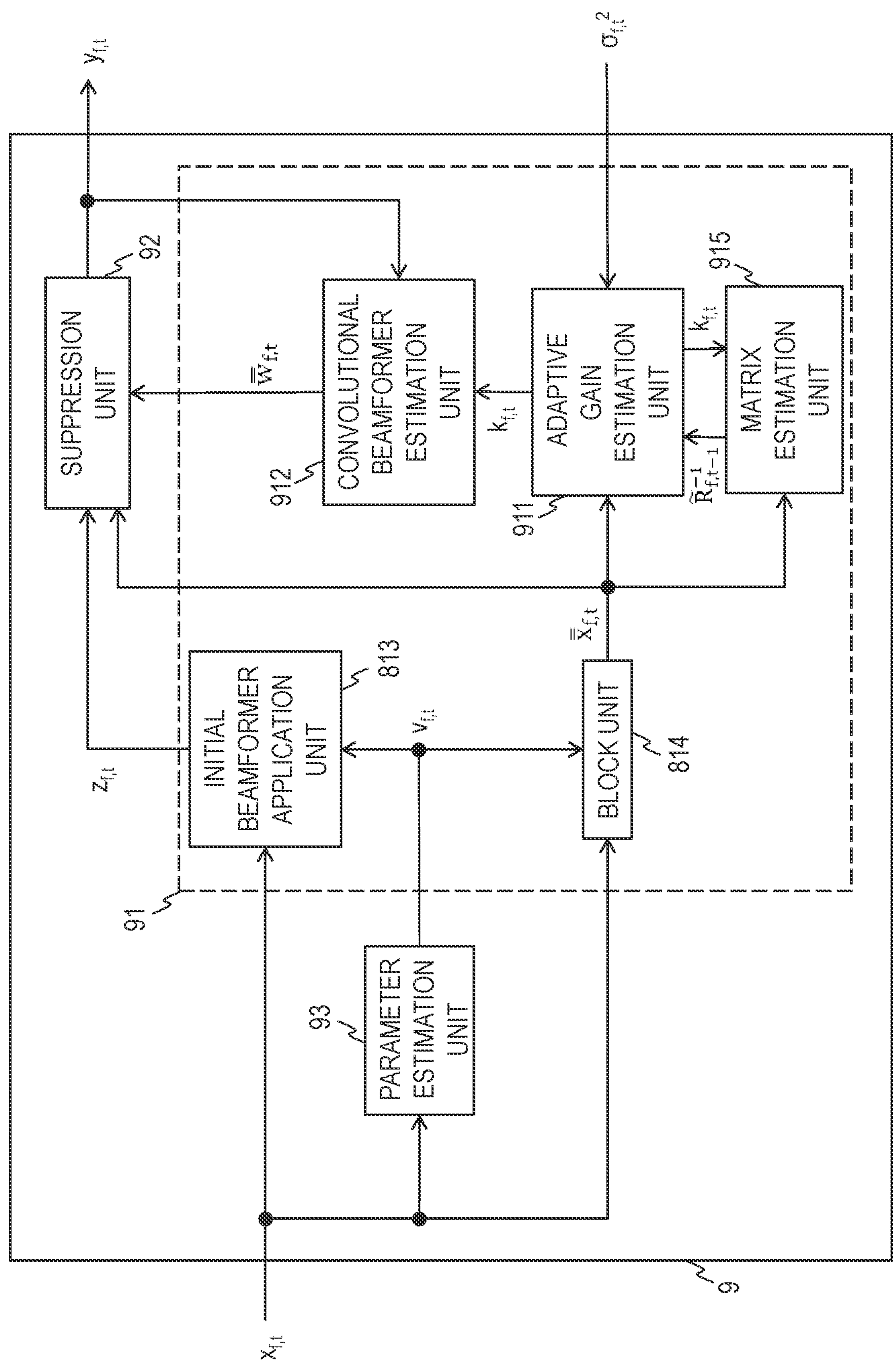
FIG. 10 is a block diagram illustrating an example of a functional configuration of a signal processing device according to a ninth embodiment.

As illustrated in FIG. 10, a signal processing device 9 according to this embodiment includes an estimation unit 91, a suppression unit 92, and a parameter estimation unit 93. The estimation unit 91 includes an adaptive gain estimation unit 911, a convolutional beamformer estimation unit 912, a matrix estimation unit 915, the initial beamformer application unit 813, and the block unit 814.

<Processing of Parameter Estimation Unit 93 (Step S93)>

The parameter estimation unit 93 (FIG. 10), using the frequency-divided observation signal $x_{f,t}$ as input, acquires and outputs the estimated steering vector $\nu_{f,t}$ by an identical method to either of the parameter estimation units 53, 63 described above. The output estimated steering vector $\nu_{f,t}$ is transmitted to the initial beamformer application unit 813 and the block unit 814.

<Processing of Initial Beamformer Application Unit 813 (Step S813)>

The estimated steering vector $\nu_{f,t}$ (the estimated steering vector of the first time interval) and the frequency-divided observation signal $x_{f,t}$ (the frequency-divided observation signal belonging to the first time interval) are input into the initial beamformer application unit 813, and the initial beamformer application unit 813 acquires and outputs the initial beamformer output $z_{f,t}$ (the initial beamformer output of the first time interval) as described in the eighth embodiment using $\nu_{f,t}$ instead of $\nu_{f,0}$. The output initial beamformer output $z_{f,t}$ is transmitted to the suppression unit 92.

<Processing of Block Unit 814 (Step S814)>

The estimated steering vector $\nu_{f,t}$ and the frequency-divided observation signal $x_{f,t}$ are input into the block unit 814, and the block unit 814 acquires and outputs the vector $x^{=}_{f,t}$ as described in the eighth embodiment by using $\nu_{f,t}$ instead of $\nu_{f,0}$. The output vector $x^{=}_{f,t}$ is transmitted to the adaptive gain estimation unit 911, the matrix estimation unit 915, and the suppression unit 92.

<Processing of Suppression Unit 92 (Step S92)>

The initial beamformer output $z_{f,t}$ output from the initial beamformer application unit 813 and the vector $x^{=}_{f,t}$ output from the block unit 814 are input into the suppression unit 92. Using these, the suppression unit 92 acquires and outputs the estimation signal of the target signal $y_{f,t}$, which is based on the initial beamformer output $z_{f,t}$ (the initial beamformer output of the first time interval), the estimated steering vector $\nu_{f,t}$ (the estimated steering vector of the first time interval), the frequency-divided observation signal $x_{f,t}$, and a convolutional beamformer $w^{=}_{f,t-1}$ (the convolutional beamformer of the second time interval that is further in the past than the first time interval). For example, the suppression unit 92 acquires and outputs the estimation signal of the target signal $y_{f,t}$ in accordance with equation (40) below.

$$y_{f,t}=z_{f,t}+\bar{\bar{w}}_{f,t-1}^{H}\bar{\bar{x}}_{f,t} \tag{40}$$

Here, the initial vector $w^{=}_{f,0}$ of the convolutional beamformer $w^{=}_{f,t-1}$ may be any (LM+M−1)-dimensional vector. An example of the initial vector $w^{=}_{f,0}$ is an (LM+M−1)-dimensional vector in which all elements are 0.

<Processing of Adaptive Gain Estimation Unit 911 (Step S911)>

The vector $x^{=}_{f,t}$ output from the block unit 814, an inverse matrix $R^{\sim -1}_{f,t-1}$ of the weighted modified space-time covariance matrix output from the matrix estimation unit 915, and the power or estimated power $\sigma_{f,t}^2$ of the target signal are input into the adaptive gain estimation unit 911. As $\sigma_{f,t}^2$ input into the matrix estimation unit 711, either the provisional power generated as illustrated in equation (17) or the estimated power $\sigma_{f,t}^2$ generated as described in the third embodiment, for example, may be used. Note that the "~" of "$R^{\sim -1}_{f,t-1}$" should be written directly above the "R", but due to notation limitations may also be written to the upper right of "R". Using these, the adaptive gain estimation unit 911 acquires and outputs an adaptive gain $k_{f,t}$ (the adaptive gain of the first time interval) that is based on the inverse matrix $R^{\sim -1}_{f,t-1}$ of the weighted modified space-time covariance matrix (the inverse matrix of the weighted modified space-time covariance matrix of the second time interval), the estimated steering vector $\nu_{f,t}$ (the estimated steering vector of the first time interval), the frequency-divided observation signal $x_{f,t}$, and the power or estimated power $\sigma_{f,t}^2$ of the target signal. For example, the adaptive gain estimation unit 911 acquires and outputs the adaptive gain $k_{f,t}$ as an (LM+M−1)-dimensional vector in accordance with equation (41) shown below.

$$k_{f,t}=\frac{\tilde{R}_{f,t-1}^{-1}\bar{\bar{x}}_{f,t}}{\alpha\sigma_{f,t}^{2}+\bar{\bar{x}}_{f,t}^{H}\tilde{R}_{f,t-1}^{-1}\bar{\bar{x}}_{f,t}} \tag{41}$$

Here, α is an oblivion coefficient, and is a real number belonging to a range of 0<α<1, for example. Further, an initial matrix of the inverse matrix $R^{\sim -1}_{f,t-1}$ of the weighted modified space-time covariance matrix may be any (LM+M−1)×(LM+M−1)-dimensional matrix. An example of the initial matrix of the inverse matrix $R^{\sim -1}_{f,t-1}$ of the weighted modified space-time covariance matrix is an (LM+M−1)-dimensional unit matrix. Here, $$\bar{\bar{x}}_{f,t}=\left[\left(B_{f,t}^{H}x_{f,t}\right)^{T},\bar{\bar{x}}_{f,t-d}^{(1)\,T},\bar{\bar{x}}_{f,t-d}^{(2)\,T},\ldots,\bar{\bar{x}}_{f,t-d}^{(M)}\right]^{T}$$

$$\bar{\bar{x}}_{f,t-d}^{(m)}=\left[x_{f,t-d}^{(m)},x_{f,t-d-1}^{(m)},\ldots,x_{f,t-d-l+1}^{(m)}\right]^{T}$$

and $$\tilde{R}_{f,t}=\sum_{\tau=0}^{t}\frac{\alpha^{t-\tau}}{\sigma_{f,t}^{2}}\bar{\bar{x}}_{f,t}\bar{\bar{x}}_{f,t}^{H}$$

Note that $R^{\sim}_{f,t}$ itself is not calculated. The output adaptive gain $k_{f,t}$ is transmitted to the matrix estimation unit 915 and the convolutional beamformer estimation unit 912.

<Processing of matrix estimation unit 915 (step S915)>

The vector $x^{=}_{f,t}$ output from the block unit 814 and the adaptive gain $k_{f,t}$ output from the adaptive gain estimation unit 911 are input into the matrix estimation unit 915. Using these, the matrix estimation unit 915 acquires and outputs an inverse matrix $R^{\sim -1}_{f,t}$ of the weighted modified space-time covariance matrix (the inverse matrix of the weighted modified space-time covariance matrix of the first time interval) that is based on the adaptive gain $k_{f,t}$ (the adaptive gain of the first time interval), the estimated steering vector $\nu_{f,t}$ (the estimated steering vector of the first time interval), the frequency-divided observation signal $x_{f,t}$, and the inverse matrix $R^{\sim -1}_{f,t-1}$, of the weighted modified space-time covariance matrix (the inverse matrix of the weighted modified space-time covariance matrix of the second time interval). For example, the matrix estimation unit 915 acquires and outputs the inverse matrix $R^{\sim -1}_{f,t}$ of the weighted modified space-time covariance matrix in accordance with equation (42) below.

$$\tilde{R}_{f,t}^{-1}=\frac{1}{\alpha}\left(\tilde{R}_{f,t-1}^{-1}-k_{f,t}\bar{\bar{x}}_{f,t}^{H}\tilde{R}_{f,t-1}^{-1}\right) \tag{42}$$

The output inverse matrix $R^{\sim -1}_{f,t}$ of the weighted modified space-time covariance matrix is transmitted to the adaptive gain estimation unit 911.

<Processing of Convolutional Beamformer Estimation Unit 912 (Step S912)>

The estimation signal of the target signal $y_{f,t}$ output from the suppression unit 92 and the adaptive gain $k_{f,t}$ output from the adaptive gain estimation unit 911 are input into the convolutional beamformer estimation unit 912. Using these, the convolutional beamformer estimation unit 912 acquires and outputs the convolutional beamformer $\bar{w}_{f,t}$ (the convolutional beamformer of the first time interval), which is based on the adaptive gain $k_{f,t}$ (the adaptive gain of the first time interval), the estimation signal of the target signal $y_{f,t}$ (the target signal of the first time interval), and the convolutional beamformer $\bar{w}_{f,t-1}$ (the convolutional beamformer of the second time interval). For example, the convolutional beamformer estimation unit 912 acquires and outputs the convolutional beamformer $\bar{w}_{f,t}$ in accordance with equation (43) shown below.

$$\bar{w}_{f,t}=\bar{w}_{f,t-1}-k_{f,t}y_{f,t}^{H} \quad (43)$$

The output convolutional beamformer $\bar{w}_{f,t}$ is transmitted to the suppression unit 92.

Modified Example 1 of Ninth Embodiment

In the ninth embodiment and the modified example thereof, a case in which the first time interval is the frame having the time frame number t and the second time interval is the frame having the time frame number t−1 was used as an example, but the present invention is not limited thereto. A frame having a time frame number other than the time frame number t may be set as the first time interval, and a time frame that is further in the past than the first time interval and has a time frame number other than the time frame number t−1 may be set as the second time interval.

Modified Example 2 of Ninth Embodiment

A known steering vector $v_{f,t}$ may be input into the initial beamformer application unit 813 and the block unit 814 instead of the estimated steering vector $v_{f,t}$ acquired by the parameter estimation unit 93. In this case, the initial beamformer application unit 813 and the block unit 814 perform steps S813 and S814, described above, using the steering vector $v_{f,t}$ instead of the estimated steering vector $v_{f,t}$.

Tenth Embodiment

Figure 11A:
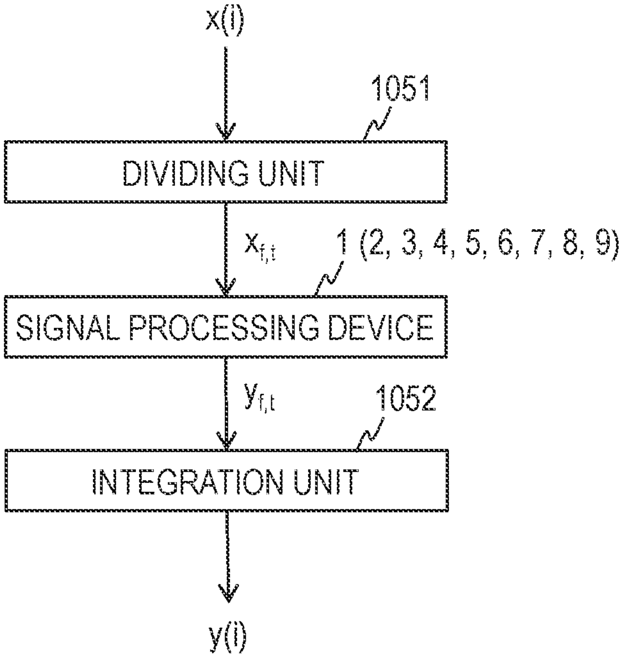
FIGS. 11A to 11C are block diagrams illustrating examples of use of the signal processing devices according to the embodiments.
Figure 11B:
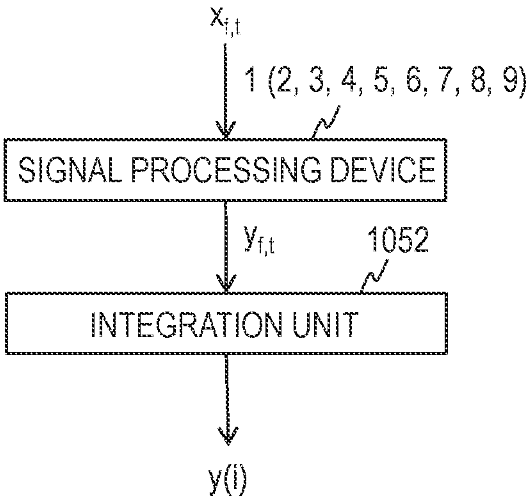
Figure 11C:
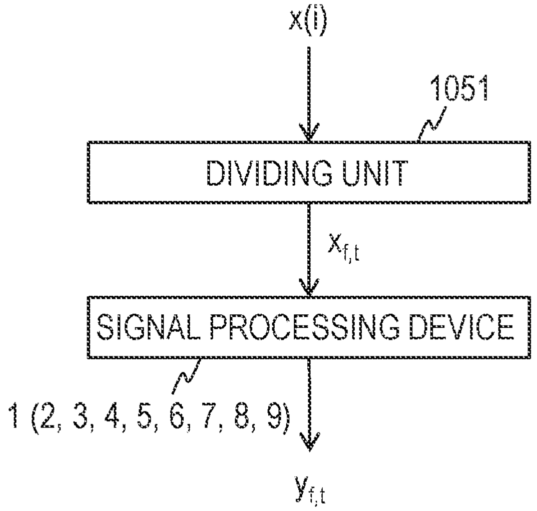

The frequency-divided observation signals $x_{f,t}$ input into the signal processing devices 1 to 9 described above may be any signals that correspond respectively to a plurality of frequency bands of an observation signal acquired by picking up an acoustic signal emitted from a sound source. For example, as illustrated in FIGS. 11A and 11C, a time-domain observation signal $x(i)=[x(i)^{(1)}, x(i)^{(2)}, \ldots, x(i)^{(M)}]^T$ (where i is an index expressing a discrete time) acquired by picking up an acoustic signal emitted from a sound source in M microphones may be input into a dividing unit 1051, and the dividing unit 1051 may transform the observation signal x(i) into frequency-divided observation signals $x_{f,t}$ in the frequency domain and input the frequency-divided observation signals $x_{f,t}$ into the signal processing devices 1 to 9. There are no limitations on the transformation method from the time domain to the frequency domain, and the discrete Fourier transform or the like, for example, may be used. Alternatively, as illustrated in FIG. 11B, frequency-divided observation signals $x_{f,t}$ acquired by another processing unit, not illustrated in the figures, may be input into the signal processing devices 1 to 9. For example, the time-domain observation signal x(i) described above may be transformed into frequency-domain signals in each time frame, the frequency-domain signals may be processed by another processing unit, and the frequency-divided observation signals $x_{f,t}$ acquired as a result may be input into the signal processing devices 1 to 9.

The estimation signal of the target signals $y_{f,t}$ output from the signal processing devices 1 to 9 may either be used in other processing (speech recognition processing or the like) without being transformed into time-domain signals y(i) or be transformed into a time-domain signal y(i). For example, as illustrated in FIG. 11C, the estimation signal of the target signals $y_{f,t}$ output from the signal processing devices 1 to 9 may be output as is and used in other processing. Alternatively, as illustrated in FIGS. 11A and 11B, the estimation signal of the target signals $y_{f,t}$ output from the signal processing devices 1 to 9 may be input into an integration unit 1052, and the integration unit 1052 may acquire and output a time-domain signal y(i) by integrating the estimation signal of the target signals $y_{f,t}$. There are no limitations on the method for acquiring the time-domain signal y(i) from the estimation signal of the target signals $y_{f,t}$, and the inverse Fourier transform or the like, for example, may be used.

Test results relating to the methods of the respective embodiments will be illustrated below.

Test Results 1 (First Embodiment)

Next, noise/reverberation suppression results acquired by the first embodiment and conventional methods 1 to 3 will be illustrated.

In this test, a data set of the "REVERB Challenge" was used as the observation signal. Acoustic data (Real Data) acquired by picking up English-language speech read aloud in a room with stationary noise and reverberation using microphones disposed in positions away (0.5 to 2.5 m) from the speaker, and acoustic data (Sim Data) acquired by simulating this environment are recorded in the data set. The number of microphones M=8. The frequency-divided observation signals were determined by the short-time Fourier transform. The frame length was set at 32 milliseconds, the frame shift was set at 4, and the prediction delay was set at d=4. Using these data, the speech quality and speech recognition precision of signals subjected to noise/reverberation suppression in accordance with the present invention and conventional methods 1 to 3 were evaluated.

FIG. 12 shows evaluation results acquired in relation to the speech quality of the observation signal and the signals subjected to noise/reverberation suppression in accordance with the present invention and conventional methods 1 to 3. "Sim" denotes the Sim Data, and "Real" denotes the Real Data. "CD" denotes cepstrum distortion, "SRMR" denotes the signal-to-reverberation modulation ratio, "LLR" denotes the log-likelihood ratio, and "FWSSNR" denotes the frequency-weighted segmental signal-to-noise ratio. CD and LLR indicate better speech quality as the values thereof decrease, while SRMR and FWSSNR indicate better speech quality as the values thereof increase. The underlined values are optimal values. As illustrated in FIG. 12, it is evident that according to the present invention, noise and reverberation can be suppressed more adequately than with conventional methods 1 to 3.

FIG. 13 shows a word error rate in the speech recognition results acquired in relation to the observation signal and the signals subjected to noise/reverberation suppression in accordance with the present invention and conventional methods 1 to 3. The word error rate indicates better speech recognition precision as the value thereof decreases. The underlined values are optimal values. "R1N" denotes a case in which the speaker is positioned close to the microphones in room 1, while "R1F" denotes a case in which the speaker is positioned far away from the microphones in room 1. Similarly, "R2N" and "R3N" respectively denote cases in which the speaker is positioned close to the microphones in rooms 2 and 3, while "R2F" and "R3E" respectively denote cases in which the speaker is positioned far away from the microphones in rooms 2 and 3. "Ave" denotes an average value. As illustrated in FIG. 12, it is evident that according to the present invention, noise and reverberation can be suppressed more adequately than with conventional methods 1 to 3.

Test Results 2 (Fourth Embodiment)

FIG. 14 shows noise/reverberation suppression results acquired in a case where the steering vector was estimated without suppressing the reverberation of the frequency-divided observation signal $x_{f,t}$ (without reverberation suppression) and a case where the steering vector was estimated after suppressing the reverberation of the frequency-divided observation signal $x_{f,t}$ (with reverberation suppression), as described in the fourth embodiment. Note that "WER" expresses the character error rate when speech recognition was performed using the target signal acquired by implementing noise/reverberation suppression. As the value of WER decreases, a better performance is achieved. As illustrated in FIG. 14, it is evident that the speech quality of the target signal is better with reverberation suppression than without reverberation suppression.

Test Results 3 (Seventh and Ninth Embodiments)

FIGS. 15A, 15B, and 15C show noise/reverberation suppression results acquired in a case where convolutional beamformer estimation was executed by successive processing, as described in the seventh and ninth embodiments. In FIGS. 15A, 15B, and 15C, L=64 [msec], $\alpha$=0.9999, and $\beta$=0.66. Further, "Adaptive NCM" indicates results acquired when the estimated steering vector $\nu_{f,t}$ generated by the method of the fifth embodiment was used. Further, "Pre-Fixed NCM" indicates results acquired when the estimated steering vector $\nu_{f,t}$ generated by the method of modified example 1 of the fifth embodiment was used. Furthermore, "observation signal" indicates results acquired when no noise/reverberation suppression was implemented. Thus, it is evident that the speech quality of the target signal is improved by the noise/reverberation suppression of the seventh and ninth embodiments.

Other Modified Examples and so on

Note that the present invention is not limited to the embodiments described above. For example, in the above embodiments, d is set at the same value in all of the frequency bands, but d may be set for each frequency band. In other words, a positive integer $d_f$ may be used instead of d. Similarly, in the above embodiments, L is set at the same value in all of the frequency bands, but L may be set for each frequency band. In other words, a positive integer $L_f$ may be used instead of L.

In the first to third embodiments, examples in which batch processing is performed by determining the cost functions and so on (equations (2), (7), (12), (13), (14), and (18)) by using a time frame corresponding to $1 \le t \le N$ as a processing unit were described, but the present invention is not limited thereto. For example, rather than using a time frame corresponding to $1 \le t \le N$ as a processing unit, the processing may be executed using a partial time frame thereof as a processing unit. Alternatively, the time frame that is used as the processing unit may be updated in real time, and the processing may be executed by determining the cost functions and so on in processing units of each time point. For example, when the number of the current time frame is expressed as $t_c$, a time frame corresponding to $1 \le t \le t_c$, may be set as the processing unit, or a time frame corresponding to $t_c - \eta \le t \le t_c$ may be set as the processing unit in relation to a positive integer constant $\eta$.

The various types of processing described above do not have to be executed in time series, as described above, and may be executed in parallel or individually either in accordance with the processing power of the device that executes the processing or in accordance with necessity. Furthermore, the processing may be modified appropriately within a scope that does not depart from the spirit of the present invention.

The devices described above are configured by, for example, having a general-purpose or dedicated computer including a processor (a hardware processor) such as a CPU (central processing unit) and a memory such as a RAM (random-access memory)/ROM (read-only memory) execute a predetermined program. The computer may include one processor and one memory, or pluralities of processors and memories. The program may be either installed in the computer or recorded in the ROM or the like in advance. Further, instead of electronic circuitry, such as a CPU, that realizes a functional configuration by reading a program, some or all of the processing units may be configured using electronic circuitry that realizes processing functions without the use of a program. Electronic circuitry constituting a single device may include a plurality of CPUs.

When the configurations described above are realized by a computer, the processing content of the functions to be included in the devices is described by the program. The computer realizes the processing functions described above by executing the program. The program describing the processing content may be recorded in advance on a computer-readable recording medium. An example of a computer-readable recording medium is a non-transitory recording medium. Examples of this type of recording medium include a magnetic recording device, an optical disk, a magneto-optical recording medium, a semiconductor memory, and so on.

The program is distributed by, for example, selling, transferring, renting, etc. a portable recording medium such as a DVD or a CD-ROM on which the program is recorded. Further, the program may be stored in a storage device of a server computer and distributed by being transferred from the server computer to another computer over a network.

For example, the computer that executes the program first stores the program recorded on the portable recording medium or transferred from the server computer temporarily in a storage device included therein. During execution of the processing, the computer reads the program stored in the storage device included therein and executes processing corresponding to the read program. As a different form of execution of the program, the computer may read the program directly from the portable recording medium and execute processing corresponding to the program. Alternatively, every time the program is transferred to the computer from the server computer, the computer may execute processing corresponding to the received program. Instead of transferring the program from the server computer to the computer, the processing described above may be executed by a so-called ASP (Application Service Provider) type service, in which processing functions are realized only by issuing commands to execute the processing and acquiring results.

Instead of realizing the processing functions of the present device by executing a predetermined program on a computer, at least some of the processing functions may be realized by hardware.

INDUSTRIAL APPLICABILITY

The present invention can be used in various applications in which it is necessary to suppress noise and reverberation from an acoustic signal. For example, the present invention can be used in speech recognition, call systems, conference call systems, and so on.

REFERENCE SIGNS LIST

1-9 Signal processing device
11, 21, 71, 81, 91 Estimation unit
12, 22 Suppression unit

The invention claimed is:

1. A signal processing device comprising processing circuitry, the processing circuitry comprising:

an estimation unit that estimates a convolutional beamformer, wherein the convolutional beamformer is used for calculating, at each time point, a weighted sum of a current signal and a past signal of a sequence of past signals with a predetermined delay and a time duration of the sequence of past signals of zero length or more, and the estimating the convolutional beamformer further comprises:

receiving frequency-divided observation signals obtained from acoustic signals emitted from a target sound source; and determining, at each time point of the sequence of time points, weights of the weighted sum as the convolutional beamformer, wherein the weighted sum causes estimation signals of target signals to increase a probability of speech-likeliness of the estimation signals based on a predetermined probability model; and a suppression unit that suppresses noise and reverberation associated with the frequency-divided observation signals to generate the estimation signals of the target signals by using the convolutional beamformer upon the frequency-divided observation signals, wherein the probability expressing the speech-likeness is according to a signal distribution of speech in the estimation signals of the target signals, and an average of the estimation signals is 0 and a variance of the estimation signals varies over time.

2. The signal processing device according to claim 1, wherein the estimation unit acquires the convolutional beamformer which maximizes the probability expressing the speech-likeness of the estimation signals based on the probability model.

3. The signal processing device according to claim 1, wherein the observation signals are signals acquired by picking up the acoustic signals emitted from the sound source in an environment in which noise and reverberation exist.

4. The signal processing device according to claim 1, wherein the convolutional beamformer is a beamformer for calculating a weighted value of a current signal at each time point.

5. A non-transitory computer-readable recording medium storing a program for causing a computer to function as the signal processing device according to claim 1.

6. A signal processing device comprising processing circuitry, the processing circuitry comprising:

an estimation unit that estimates a convolutional beamformer, wherein the convolutional beamformer is used for calculating, at each time point, a weighted sum of a current signal and a past signal of a sequence of past signals with a predetermined delay and a time duration of the sequence of past signals of zero length or more, and the estimating the convolutional beamformer further comprises:

receiving frequency-divided observation signals obtained from acoustic signals emitted from a target sound source; and determining, at each time point of the sequence of time points, weight of the weighted sum as the convolutional beamformer, wherein the weighted sum causes estimation signals of target signals to increase a probability of speech-likeliness of the estimation signals based on a predetermined probability model; and a suppression unit that suppresses noise and reverberation associated with the frequency-divided observation signals to generate the estimation signals of the target signals by using the convolutional beamformer upon the frequency-divided observation signals, wherein the estimation unit acquires the convolutional beamformer which minimizes a sum of values acquired by weighting power of the estimation signals at respective time points belonging to a predetermined time interval by reciprocals of the power of the target signals or reciprocals of an estimated power of the target signals, under a constraint condition in which the target signals are not distorted as a result of applying the convolutional beamformer to the frequency-divided observation signals where the target signals are signals that correspond to a direct sound and an initial reflected sound within signals corresponding to a sound emitted from the target sound source and picked up by a microphone.

7. The signal processing device according to claim 6, wherein the convolutional beamformer is equivalent to a beamformer acquired by integrating a reverberation suppression filter for suppressing reverberation from the frequency-divided observation signals and an instantaneous beamformer for suppressing noise from signals acquired by applying the reverberation suppression filter to the frequency-divided observation signals, the instantaneous beamformer calculates a weighted sum of signals of a current time point at each time point, and the constraint condition is a condition in which a value acquired by applying the instantaneous beamformer to a steering vector having, as an element, transfer functions relating to the direct sound and the initial reflected sound from the sound source to a pickup position of the acoustic signals, or to an estimated steering vector that is an estimated vector of the steering vector, is a constant.

8. The signal processing device according to claim 7, wherein the estimation unit includes:

a matrix estimation unit that acquires a weighted space-time covariance matrix on the basis of the frequency-divided observation signals and the power or estimated power of the target signals; and a convolutional beamformer estimation unit that acquires the convolutional beamformer on the basis of the weighted space-time covariance matrix and the steering vector or estimated steering vector.

9. The signal processing device according to claim 7, further comprising processing circuitry configured to implement:

a reverberation suppression unit that acquires frequency-divided reverberation-suppressed signals in which a reverberation component has been suppressed from the frequency-divided observation signals; and a steering vector estimation unit that acquires and outputs the estimated steering vector from the frequency-divided reverberation-suppressed signals.

10. The signal processing device according to claim 9, wherein the frequency-divided reverberation-suppressed signals are time series signals, the signal processing device further comprises processing circuitry configured to implement:

an observation signal covariance matrix updating unit that acquires a spatial covariance matrix of the frequency-divided reverberation-suppressed signals belonging to a first time interval, the spatial covariance matrix being based on the frequency-divided reverberation-suppressed signals belonging to the first time interval and a spatial covariance matrix of the frequency-divided reverberation-suppressed signals belonging to a second time interval that is further in the past than the first time interval; and a main component vector updating unit that acquires, on the basis of an inverse matrix of a noise covariance matrix of the frequency-divided reverberation-suppressed signals, a spatial covariance matrix of the frequency-divided reverberation-suppressed signals belonging to the first time interval, and a main component vector of the second time interval, a main component vector of the first time interval relative to a product of the inverse matrix of the noise covariance matrix of the frequency-divided reverberation-suppressed signals and the spatial covariance matrix of the frequency-divided reverberation-suppressed signals belonging to the first time interval, wherein the steering vector estimation unit acquires and outputs the estimated steering vector of the first time interval on the basis of the noise covariance matrix of the frequency-divided reverberation-suppressed signal and the main component vector of the first time interval.

11. The signal processing device according to claim 7, wherein the frequency-divided reverberation-suppressed signals are time series signals, the signal processing device further comprises processing circuitry configured to implement:

an observation signal covariance matrix updating unit that acquires a spatial covariance matrix of the frequency-divided observation signals belonging to a first time interval, the spatial covariance matrix being based on the frequency-divided observation signals belonging to the first time interval and a spatial covariance matrix of the frequency-divided observation signals belonging to a second time interval that is further in the past than the first time interval;

a main component vector updating unit that acquires, on the basis of an inverse matrix of a noise covariance matrix of the frequency-divided observation signals, a spatial covariance matrix of the frequency-divided observation signals belonging to the first time interval, and a main component vector of the second time interval, a main component vector of the first time interval relative to a product of the inverse matrix of the noise covariance matrix of the frequency-divided observation signals and the spatial covariance matrix of the frequency-divided observation signals belonging to the first time interval; and a steering vector estimation unit that acquires and outputs the estimated steering vector of the first time interval on the basis of the main component vector of the first time interval and the noise covariance matrix of the frequency-divided observation signals.

12. The signal processing device according to claim 10 or 11, wherein the estimation unit includes:

a matrix estimation unit that estimates an inverse matrix of a space-time covariance matrix of the first time interval on the basis of the frequency-divided observation signals, the power or estimated power of the target signals, and an inverse matrix of a space-time covariance matrix of the second time interval that is further in the past than the first time interval; and a convolutional beamformer estimation unit that acquires the convolutional beamformer of the first time interval on the basis of the inverse matrix of the space-time covariance matrix of the first time interval and the estimated steering vector.

13. The signal processing device according to claim 10 or 11, wherein the instantaneous beamformer is equivalent to a sum of a constant multiple of the estimated steering vector and a product of a block matrix corresponding to an orthogonal complement of the estimated steering vector and a modified instantaneous beamformer, and the estimation unit includes:

an initial beamformer application unit that acquires an initial beamformer output of the first time interval that is based on the estimated steering vector of the first time interval and the frequency-divided observation signals belonging to the first time interval;

the suppression unit that acquires the estimation target signals of the first time interval that is based on the initial beamformer output of the first time interval, the estimated steering vector of the first time interval and the frequency-divided observation signal, and the convolutional beamformer of the second time interval that is further in the past than the first time interval;

an adaptive gain estimation unit that acquires an adaptive gain of the first time interval that is based on an inverse matrix of the weighted modified space-time covariance matrix of the second time interval, and the estimated steering vector of the first time interval, the frequency-divided observation signals and the power or estimated power of the target signals;

a matrix estimation unit that acquires an inverse matrix of the weighted modified space-time covariance matrix of the first time interval that is based on the adaptive gain of the first time interval, the estimated steering vector of the first time interval and the frequency-divided observation signals, and the inverse matrix of the weighted modified space-time covariance matrix of the second time interval; and the convolutional beamformer estimation unit that acquires the convolutional beamformer of the first time interval that is based on the adaptive gain of the first time interval, the estimation signals of the first time interval, and the convolutional beamformer of the second time interval.

14. The signal processing device according to claim 7, wherein the estimation unit includes:

a matrix estimation unit that acquires a weighted modified space-time covariance matrix that is based on the steering vector or the estimated steering vector, the frequency-divided observation signals, and the power or estimated power of the target signals, where the weighted modified space-time covariance matrix is characterized in that when the instantaneous beamformer is represented by a sum of a constant multiple of the steering vector or a constant multiple of the estimated steering vector and a product of a block matrix corresponding to an orthogonal complement of the steering vector or the estimated steering vector and a modified instantaneous beamformer, the weighted modified space-time covariance matrix has signals acquired as a result of multiplying the block matrix by the frequency-divided observation signals of the first time interval as elements; and a convolutional beamformer estimation unit that acquires the convolutional beamformer based on the steering vector or the estimated steering vector, the weighted modified space-time covariance matrix, and the frequency-divided observation signals.

15. A non-transitory computer-readable recording medium storing a program for causing a computer to function as the signal processing device according to claim 6.

16. A signal processing method comprising:

an estimation step of estimating a convolutional beamformer, wherein the convolutional beamformer is used for calculating, at each time point, a weighted sum of a current signal and a past signal of a sequence of past signals with a predetermined delay and a time duration of the sequence of past signals of zero length or more, and the estimating the convolutional beamformer further comprises:

receiving frequency-divided observation signals obtained from acoustic signals emitted from a target sound source;

calculating, at each time point of the sequence of time points, weights of the weighted sum as the convolutional beamformer, wherein the weighted sum causes the estimation signals of the target signals to increase a probability of speech-likeliness of the estimation signals based on a predetermined probability model; and a suppression step of suppressing noise and reverberation associated with the frequency-divided observation signals to generate the estimation signals of the target signals by using the convolutional beamformer upon the frequency-divided observation signals, wherein the probability expressing the speech-likeness is according to a signal distribution of speech in the estimation signals of the target signals, and an average of the estimation signals is 0 and a variance of the estimation signals varies over time.

17. A signal processing method comprising:

an estimation step of estimating a convolutional beamformer, wherein the convolutional beamformer is used for calculating, at each time point, a weighted sum of a current signal and a past signal of a sequence of past signals with a predetermined delay and a time duration of the sequence of past signals of zero length or more, and the estimating the convolutional beamformer further comprises:

receiving frequency-divided observation signals obtained from acoustic signals emitted from a target sound source; and determining, at each time point of the sequence of time points, weights of the weighted sum as the convolutional beamformer, wherein the weighted sum causes the estimation signals of the target signals to increase a probability of speech-likeliness of the estimation signals based on a predetermined probability model; and a suppression step of suppressing noise and reverberation associated with the frequency-divided observation signals to generate the estimation signals of the target signals by using the convolutional beamformer upon the frequency-divided observation signals, wherein the estimation step acquires the convolutional beamformer which minimizes a sum of values acquired by weighting power of the estimation signals at respective time points belonging to a predetermined time interval by reciprocals of the power of the target signals or reciprocals of an estimated power of the target signals, under a constraint condition in which the target signals are not distorted as a result of applying the convolutional beamformer to the frequency-divided observation signals where the target signals are signals that correspond to a direct sound and an initial reflected sound within signals corresponding to a sound emitted from the target sound source and picked up by a microphone.

* * * * *